United States Patent
Isozaki et al.

(10) Patent No.: US 7,706,664 B2
(45) Date of Patent: Apr. 27, 2010

(54) APPARATUS, METHOD, AND PROGRAM PRODUCT FOR RECORDING AND REPRODUCING CONTENTS

(75) Inventors: Hiroshi Isozaki, Kanagawa (JP); Shinichi Matsukawa, Tokyo (JP); Atsushi Ishihara, Kanagawa (JP); Taku Kato, Kanagawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 871 days.

(21) Appl. No.: 10/591,179
(22) PCT Filed: Jun. 28, 2006
(86) PCT No.: PCT/JP2006/313347

§ 371 (c)(1),
(2), (4) Date: Aug. 30, 2006

(87) PCT Pub. No.: WO2007/001087

PCT Pub. Date: Jan. 4, 2007

(65) Prior Publication Data

US 2008/0232785 A1 Sep. 25, 2008

(30) Foreign Application Priority Data

Jun. 28, 2005 (JP) ............................. 2005-189053

(51) Int. Cl.
*H04N 5/91* (2006.01)
(52) U.S. Cl. .............................. 386/94; 386/95; 386/126
(58) Field of Classification Search ................... 386/46, 386/94, 95, 112, 125, 126
See application file for complete search history.

(56) References Cited

U.S. PATENT DOCUMENTS

2005/0038997 A1 2/2005 Kojima et al.

FOREIGN PATENT DOCUMENTS

WO    WO 01/93000 A2   12/2001

OTHER PUBLICATIONS

U.S. Appl. No. 11/530,366, filed Sep. 8, 2006, Isozaki et al.

(Continued)

*Primary Examiner*—Huy T Nguyen
(74) *Attorney, Agent, or Firm*—Oblon, Spivak, McClelland, Maier & Neustadt, L.L.P.

(57) ABSTRACT

A contents recording and reproducing apparatus performs a record and a reproduce of a recording medium, in which the recording medium records a title key file registering therein at least one title key which encrypts each of plural title contents corresponding to a program video or sound, and title contents encrypted by the title key. The contents recording and reproducing apparatus includes an TKF initializing unit 141 which generates a title key file and records it in the recording medium, a random number generating unit 111 which generates a random number corresponding to each of the plural title key files, and a recording unit 113 which records a plurality of title key files in a DVD medium 140. The TKF initializing unit 141 registers the random number, the TKF random number corresponding to the title key file, and an encryption title key.

18 Claims, 19 Drawing Sheets

OTHER PUBLICATIONS

"Advanced Access Content System (AACS), Introduction and Common Cryptographic Elements", AACS, Revision 0.90, Preliminary Draft, Apr. 14, 2005, the whole book.

"Advanced Access Content System (AACS), Recordable Video Book", AACS, Revision 0.90, Preliminary Draft, Apr. 14, 2005, the whole book.

"Advanced Access Content System (AACS) Blu-ray Disc Pre-recorded Book", Revision 0.91, XP-007900016, Feb. 17, 2006, (The whole document) pp. 1-12 and 1-77.

ETK1 = f (TK, BN1, TKFN3)
ETK2 = f (TK, BN2, TKFN1)
ETK3 = f (TK, BN3, TKFN2)

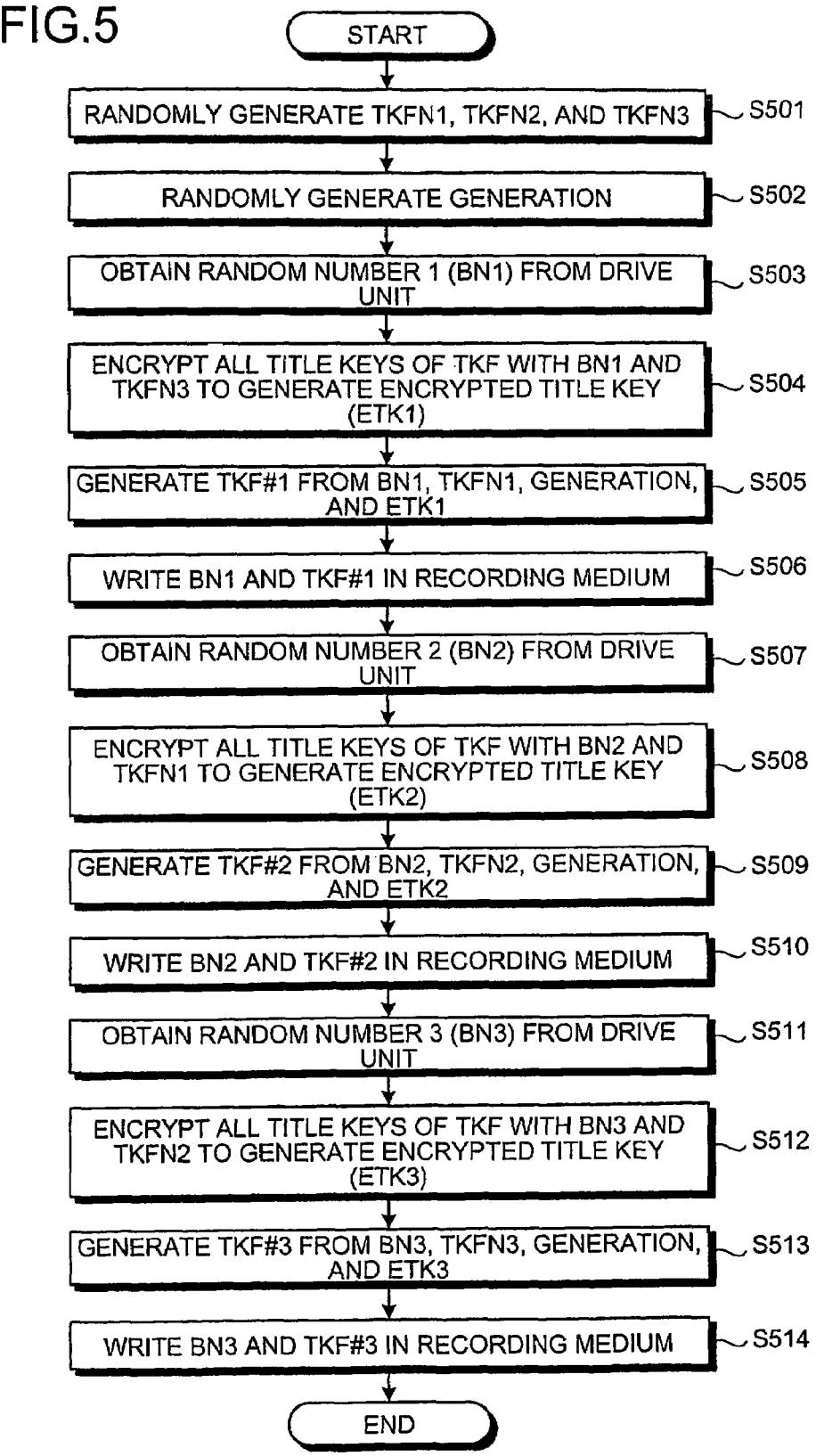

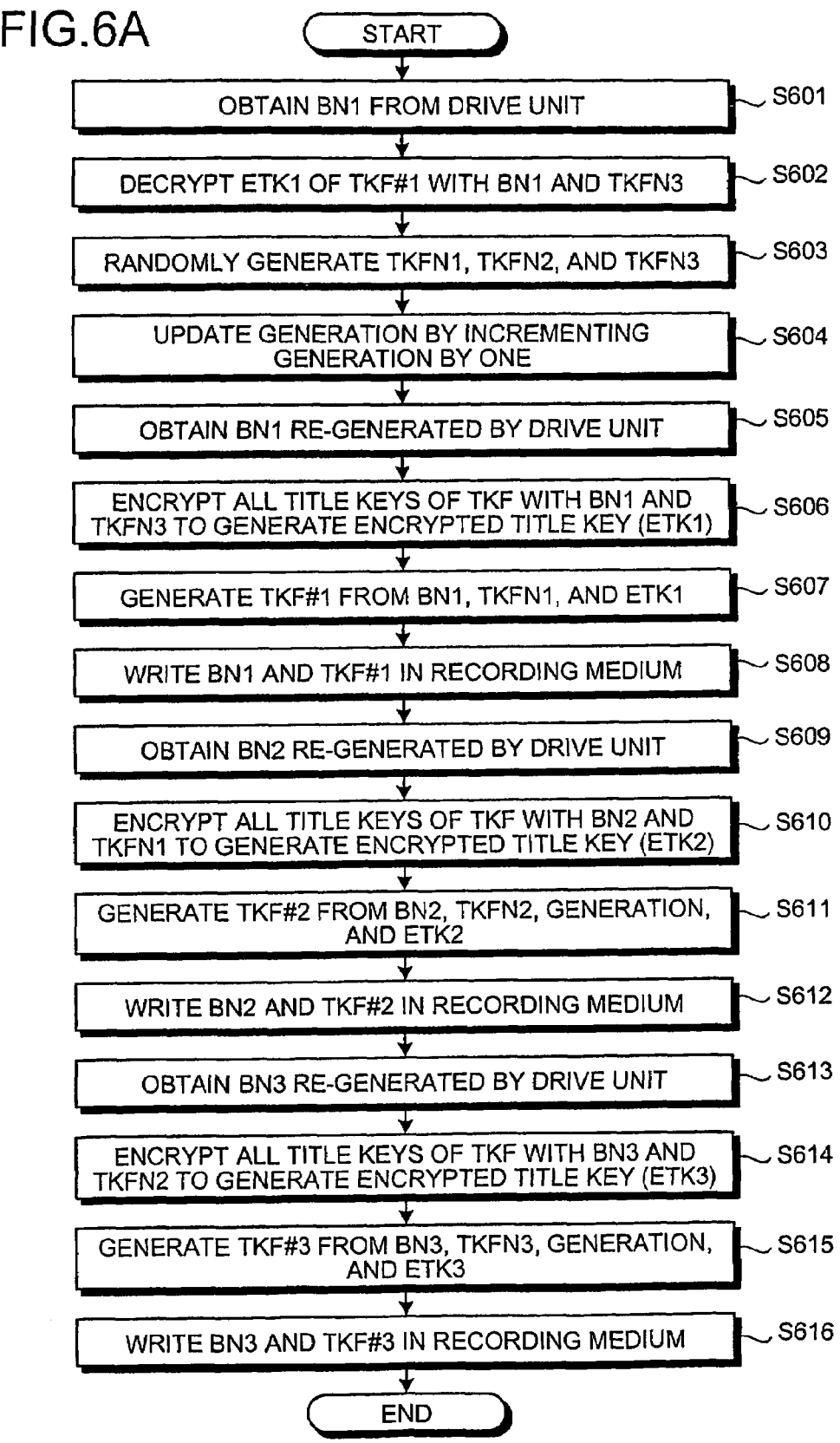

FIG.12
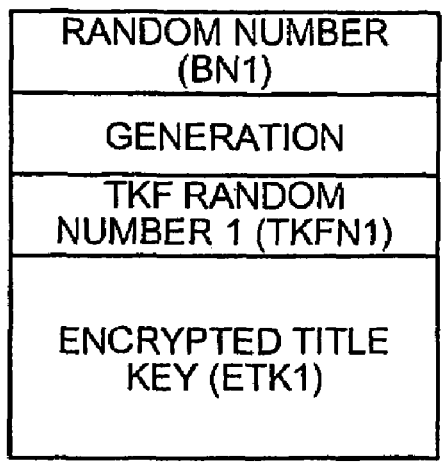
TKF#1
- RANDOM NUMBER (BN1)
- GENERATION
- TKF RANDOM NUMBER 1 (TKFN1)
- ENCRYPTED TITLE KEY (ETK1)
BACKUP ↙   BACKUP ↘
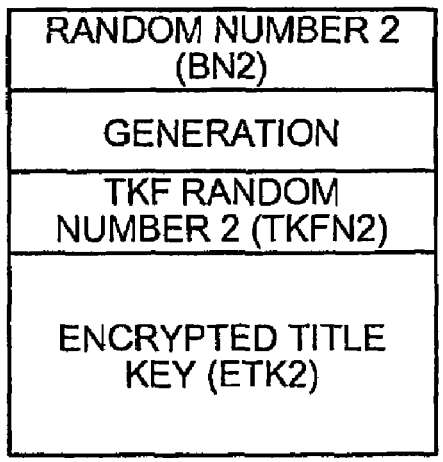
TKF#2
- RANDOM NUMBER 2 (BN2)
- GENERATION
- TKF RANDOM NUMBER 2 (TKFN2)
- ENCRYPTED TITLE KEY (ETK2)
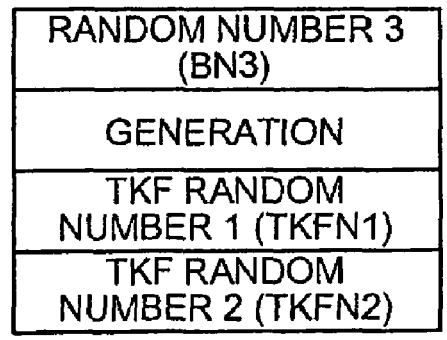
TKF#3
- RANDOM NUMBER 3 (BN3)
- GENERATION
- TKF RANDOM NUMBER 1 (TKFN1)
- TKF RANDOM NUMBER 2 (TKFN2)
$$ETK1 = f(TK, BN1, TKFN2)$$
$$ETK2 = f(TK, BN2, TKFN1)$$

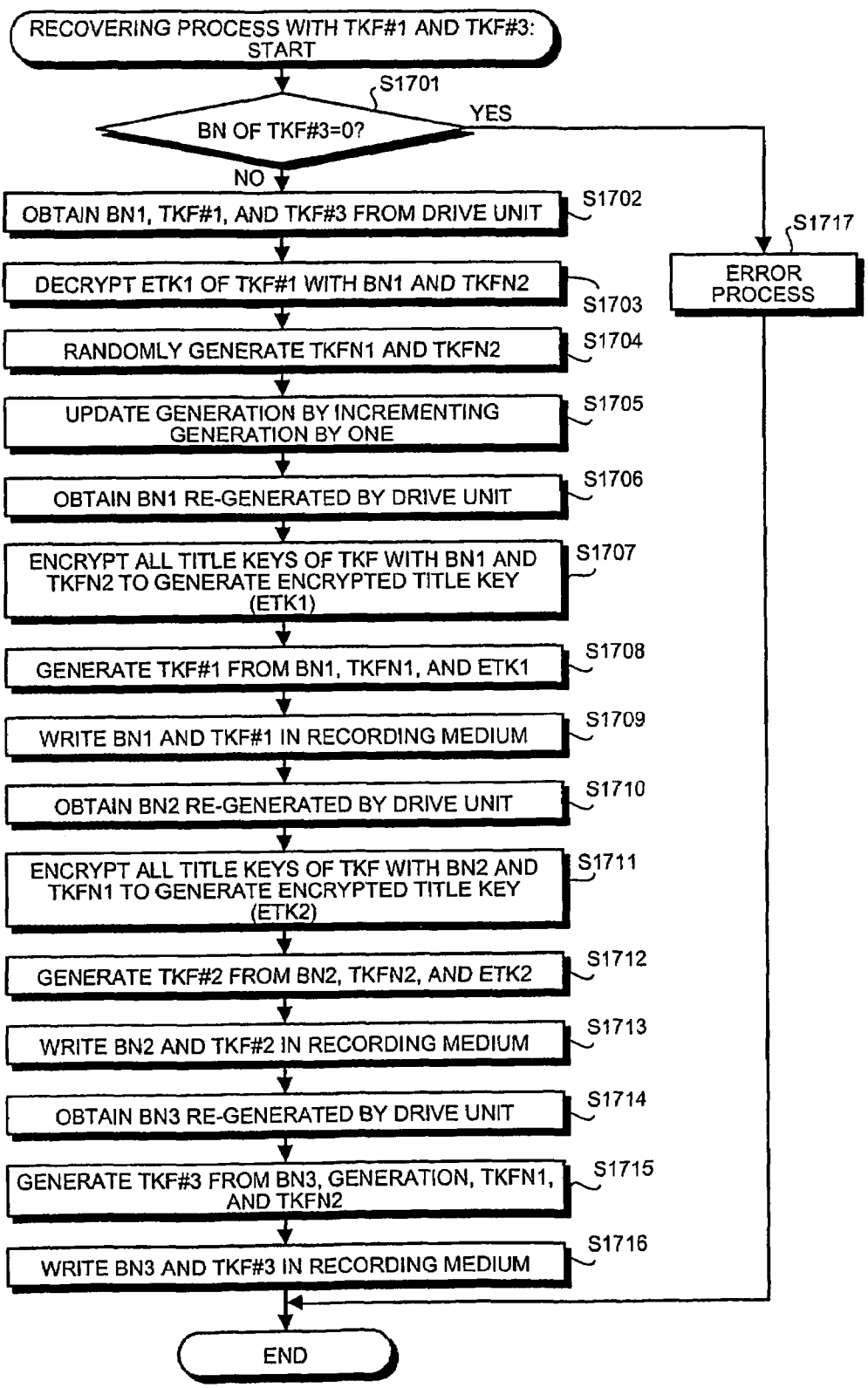

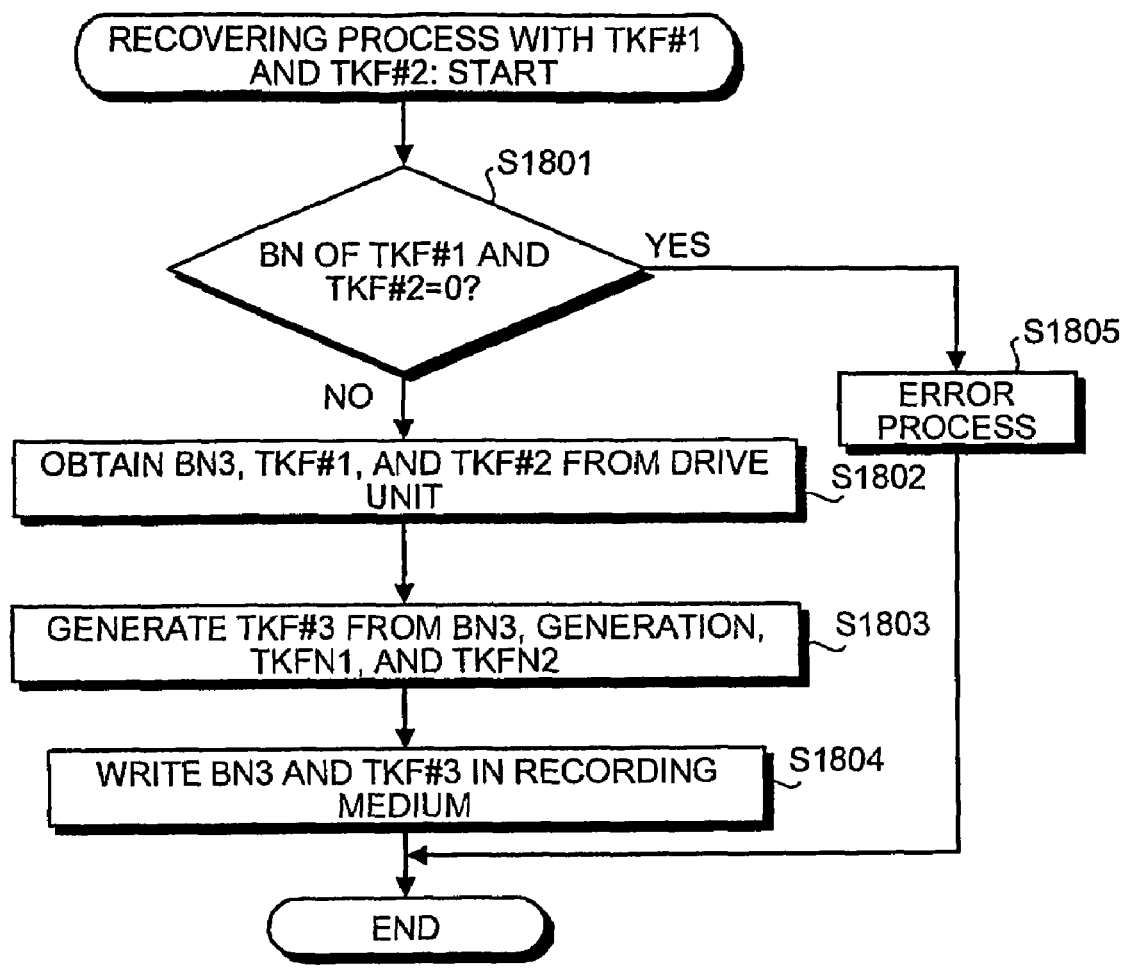

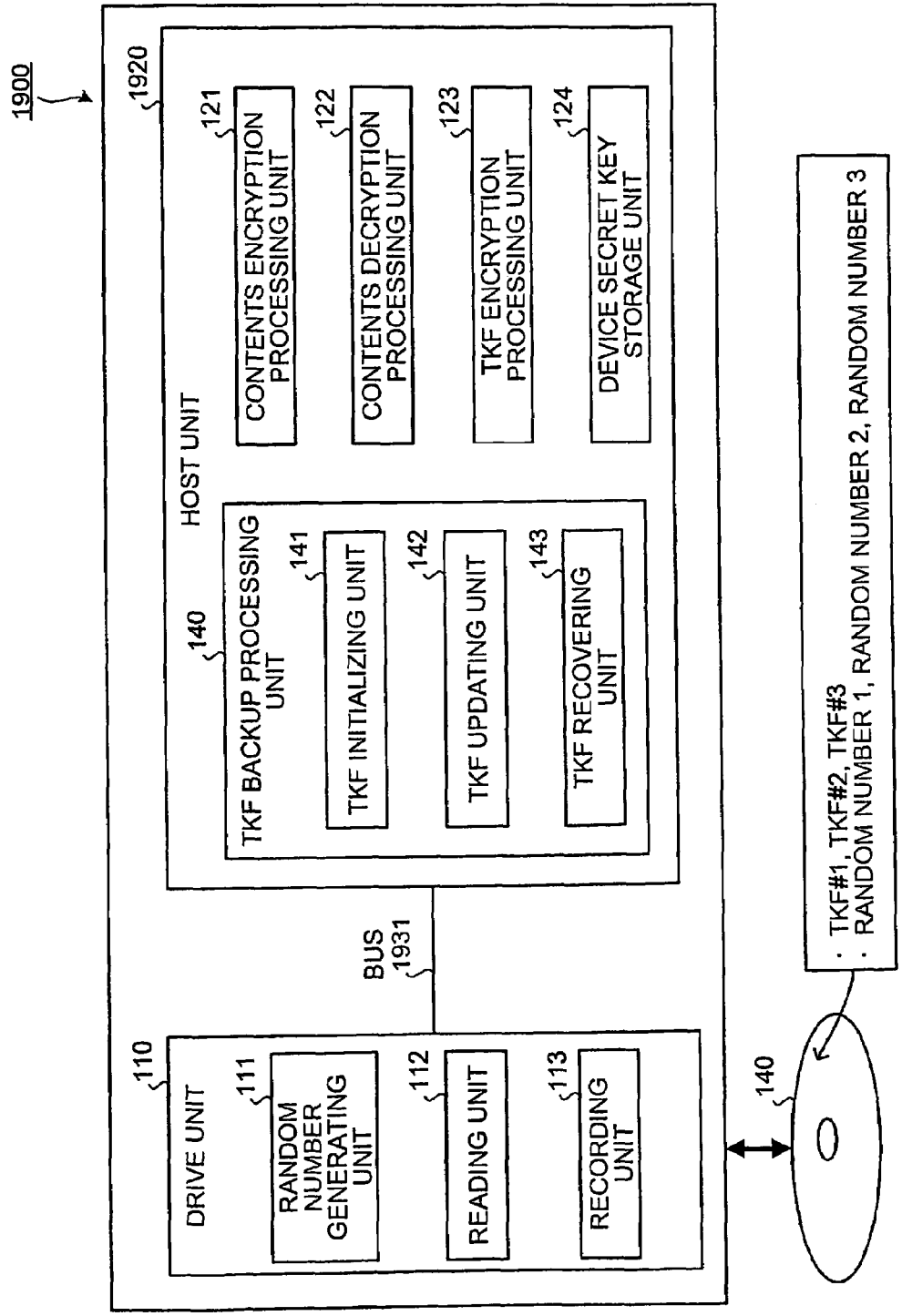

APPARATUS, METHOD, AND PROGRAM PRODUCT FOR RECORDING AND REPRODUCING CONTENTS

TECHNICAL FIELD

The present invention relates to a contents recording and reproducing apparatus, a contents recording and reproducing method, and a contents recording and reproducing program product for recording and reproducing a recording medium, in which the recording medium records a title key file registering therein at least one title key which encrypts each of plural title contents corresponding to a program video or sound, and title contents encrypted by the title key.

BACKGROUND ART

As disclosed in Non-Patent Document 1, in order to prevent unauthorized copy of contents recorded in the recording medium such as a DVD (Digital Versatile Disk), conventionally there is known a technique in which an encryption process is performed to each of the plural title contents which are of contents of the program video or sound using the different title key, and the encrypted title contents are recorded in the DVD medium.

In the technique disclosed in Non-Patent Document 1, each of the plural title key is encrypted using a device key and a random number, and the encrypted title key and the random number are registered in the title key file and recorded in the DVD medium. The device key is imparted in each recording and reproducing apparatus such as a DVD recorder which rightly records and reproduces the contents. The random number is randomly generated. In the case where the title contents are reproduced, the encrypted title key registered in the title key file is decrypted using the random number and the device key of the recording and reproducing apparatus used for the reproduction, and the title contents are decrypted using the decrypted title key to reproduce the title contents.

In the case where a part of the title contents is deleted in a rewritable DVD medium, the title key file is updated. Specifically, the title key file is decrypted once, a random number is newly generated, the title key file in which the title key corresponding to the title contents deleted from the DVD medium is deleted using the device key is encrypted again using the new random number and the device key, and the title key file is recorded in the DVD medium. Therefore, it is possible to prevent attack in which the title key corresponding to the deleted title contents is previously copied and the deleted title contents are improperly reproduced using the copied title key.

Like this contents protection using the title key is effective technique for preventing unauthorized use of the contents in the DVD medium. However, in the case where the title key file cannot be read because a part of an area cannot be read by stains and flaws in the DVD medium, or in the case where a user deletes the title key file by mistake, the title contents cannot be decrypted, and the reproduction cannot be performed. Therefore, a copy of the title key file is recorded as a backup file in the DVD medium, and the backup file is used as the title key file when the title key file cannot be read due to breakage of the title key file or the like.

[Non-Patent Document 1: Advanced Access Content System (AACS) Recordable Video Book Revision 0.90

DISCLOSURE OF THE INVENTION

Problem to be Solved by the Invention

However, only when the simple backup file of the title key file is recorded in the DVD medium, the unauthorized reproduction of the contents is permitted. For example, it is assumed that an attacker previously copies the backup file of the title key file in another medium. In this case, when a part of the title contents is moved to another medium in a normal manner, the title key file in which the title key corresponding to the moved title contents is deleted is updated. At this point, the attacker deletes the title key file from the DVD medium, and the attacker restores the backup file copied in another medium in the DVD medium. The recording and reproducing apparatus restores the title key file from the backup file because the original title key file does not exist in the DVD medium. Therefore, because the backup file is the title key file which is produced before the update, the title key corresponding to the title contents which should be deleted from the DVD medium to be improperly restored.

In view of the foregoing, an object of the invention is to provide a contents recording and reproducing apparatus, a contents recording and reproducing method, and a contents recording and reproducing program product, which can prevent the improper restoration of the contents by a malicious third party while the title key file can securely be restored.

Means for Solving Problem

According to one aspect of the present invention, a contents recording and reproducing apparatus includes a recording and reproducing unit which performs a record and a reproduce of a recording medium, in which the recording medium records a title key file registering therein at least one of a title key which encrypts each of plural title contents corresponding to a program video or sound, and title contents encrypted by the title key, a key file generating unit which generates at least one of the title key file and registers at least one of the title key in the generated title key file, a random number generating unit which generates a random number corresponding to each of the plural title key files and a TKF random number generating unit which generates a TKF random number for encrypting other title key file associated with the title key file, wherein the recording and reproducing unit records a set of the title key file generated and the random number in the recording medium, and the key file generating unit registers the random number corresponding to the title key file, the TKF random number corresponding to the title key file, and an encrypted title key, where the encrypted title key is formed by encrypting the title key with the random number corresponding to the title key file and with the TKF random number corresponding to the other title key file.

According to another aspect of the present invention, a method of recording and reproducing contents includes performing a record and a reproduce of a recording medium, in which the recording medium records a title key file registering therein at least one of a title key which encrypts each of plural title contents corresponding to a program video or sound, and title contents encrypted by the title key, generating at least one of the title key file and registering at least one of the title key in the generated title key file, generating a random number corresponding to each of the plural title key files, generating a TKF random number for encrypting other title key file, recording a set of the title key file generated and the random number in the recording medium, and registering the random number corresponding to the title key file, the TKF random number corresponding to the title key file, and an encrypted title key, where the encrypted title key is formed by encrypting the title key with the random number corresponding to the title key file and with the TKF random number corresponding to the other title key file.

A computer program product according to still another aspect of the present invention causes a computer to perform the method according to the present invention.

BRIEF DESCRIPTION OF THE DRAWINGS

FIG. 5 is a flowchart showing a procedure of a process of initializing a title key file (TKF) backup;

FIG. 6A is a flowchart showing a procedure of a process of updating the title key file (TKF) backup;

FIG. 12 is an explanatory view showing structures of a title key file and a backup file of a second embodiment;

FIG. 17 is a flowchart showing a procedure of a recovering process performed by the title key file TKF#1 and the backup file TKF#3 in the second embodiment;

FIG. 18 is a flowchart showing a procedure of a recovering process performed by the title key file TKF#1 and the backup file TKF#2 in the second embodiment; and FIG. 19 is a block diagram showing a configuration of a contents recording and reproducing apparatus in which a drive unit and a host unit are integrally formed by connecting the drive unit and the host unit with an internal bus.

BEST MODES FOR CARRYING OUT THE INVENTION

Best modes of the contents recording and reproducing apparatus, the contents recording and reproducing method, and the contents recording and reproducing program product will be described in detail with reference to the accompanying drawings.

First Embodiment

Figure 1:
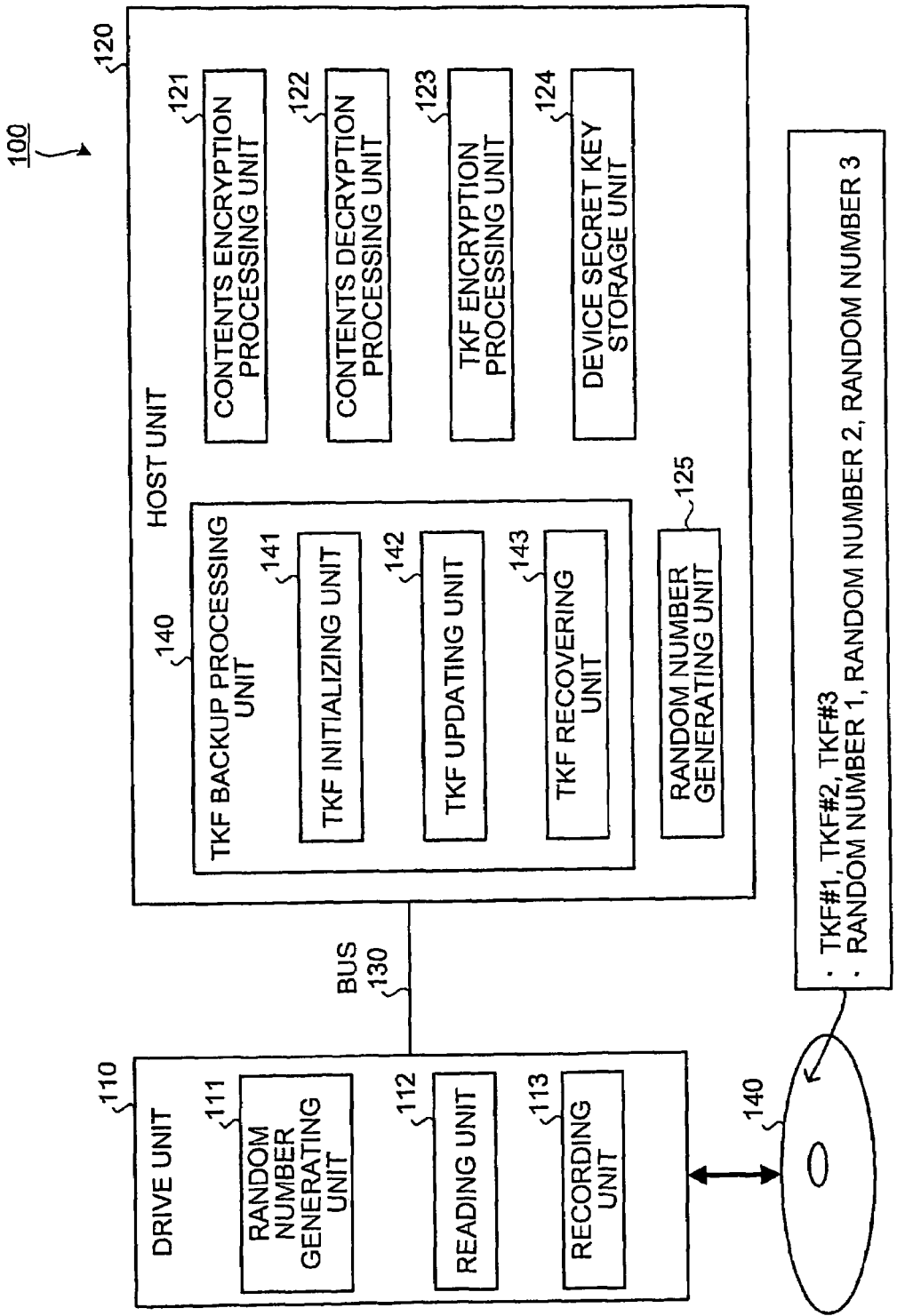
FIG. 1 is a block diagram showing a configuration of a contents recording and reproducing apparatus according to a first embodiment.

FIG. 1 is a block diagram showing a configuration of a contents recording and reproducing apparatus 100 according to a first embodiment. Here, a DVD recorder which performs recording and reproducing of a DVD medium can be exemplifying as an example of the contents recording and reproducing apparatus 100. As shown in FIG. 1, a drive unit 110 and a host unit 120 are connected with a bus 130 in the configuration of the contents recording and reproducing apparatus 100 according to the first embodiment. The drive unit 110 records data in a rewritable DVD medium 140, and the drive unit 110 reads the data from the DVD medium 140. The host unit 120 encrypts and decodes the title contents, and the host unit 120 performs a backup process of a title key file (TKF).

As shown in FIG. 1, a title key file (TKF#1), TKF#2 and TKF#3, and random numbers 1 to 3 are recorded in the DVD medium 140. TKF#2 and TKF#3 are backup files of the title key file. The title key file (TKF#1), TKF#2 and TKF#3, and random numbers 1 to 3 will be described later.

A DVD medium pursuant to an HD-DVD (High Density Digital Versatile Disk) Video Recording standard is a target format of the DVD medium 140 used in the contents recording and reproducing apparatus 100 of the first embodiment. However, the DVD medium 140 is not always limited to the DVD medium pursuant to the HD-DVD Video Recording standard.

The drive unit 110 mainly includes a random number generating unit 111, a readout unit 112, and a recording unit 113. The random number generating unit 111 randomly generates a random number, the readout unit 112 directly reads the data from the DVD medium 140, and the recording unit 113 directly records the data in the DVD medium 140.

As shown in FIG. 1, the host unit 120 mainly includes a contents encryption processing unit 121, a contents decryption processing unit 122, a TKF encryption processing unit 123, a device secret key storage unit 124, a backup processing unit 140, and random number generating unit 125.

The contents encryption processing unit 121 is a processing unit which encrypts the title contents using the title key. The contents decryption processing unit 122 is a processing unit which decrypts the encrypted title contents using the title key.

As used herein, the title contents mean a unit of the contents of a video or sound as a program. For example, the contents of one movie become one title contents. The title key is a key for encrypting the title contents. In each case, the different title key is used for the title contents. The plural titles may be encrypted by the same title key.

The TKF encryption processing unit 123 is a processing unit which encrypts the title key file (TKF). As used herein, the title key file (TKF) means a set of at least one title key which is encrypted by a random number and a device secret key possessed by the contents recording and reproducing apparatus 100, and the set of the title key and the random number used in encryption is the registered file. A later-mentioned random number, a TKF random number, and at least one title key are registered in the title key file, and the title key file is recorded in the DVD medium 140. The TKF random number generates the encrypted title key of a file except for the title key file itself or the backup file. The detailed title key file will be described later with reference to FIGS. 4A and 4B.

Returning to FIG. 1, the device secret key storage unit 124 is a recording medium such as a memory in which the device secret key is stored. As used herein, the device secret key means a secret key previously imparted to the formal contents recording and reproducing apparatus 100, and the device secret key also means a key for encrypting and decrypting the title key of the title key file.

The TKF backup processing unit 140 is a processing unit which performs a backup process for the title key file (TKF) recorded in the DVD medium 140. The TKF backup processing unit 140 mainly includes a TKF initializing unit 141, a TKF updating unit 142, and a TKF recovering unit 143.

The TKF initializing unit 141 is a processing unit which generates a title key file (TKF#1) and title key files TKF#2 and TKF#3. The title key file (TKF#1) is recorded in the DVD medium 140, and the title key files TKF#2 and TKF#3 are of the backup file.

The title key file is updated when a title key list is changed by the deletion or addition of a part of the title contents in the DVD medium 140. The TKF updating unit 142 is a processing unit which re-generates and updates the title key file TKF#1, and the title key files TKF#2 and TKF#3 as the backup file.

The TKF recovering unit 143 is a processing unit which reproduces the title key from one of the title key file TKF#1 and the title key files TKF#2 and TKF#3 as the backup file to recover the title key file and the title key file as the backup file, in the case where one of the title key file TKF#1 and the title key files TKF#2 and TKF#3 as the backup file is broken in the DVD medium 140, or in the case where one of the title key file TKF#1 and the title key files TKF#2 and TKF#3 as the backup file does not exist in the DVD medium 140. The random number generating unit 125 is a processing unit which generates the later-mentioned TKF random number.

Figure 2:
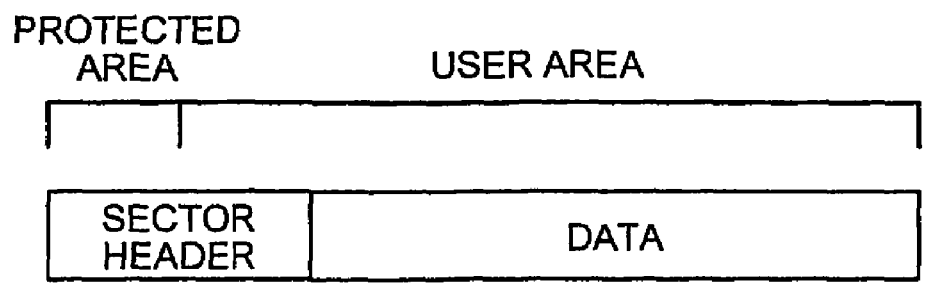
FIG. 2 is an explanatory view showing a sector structure.
Figure 3:
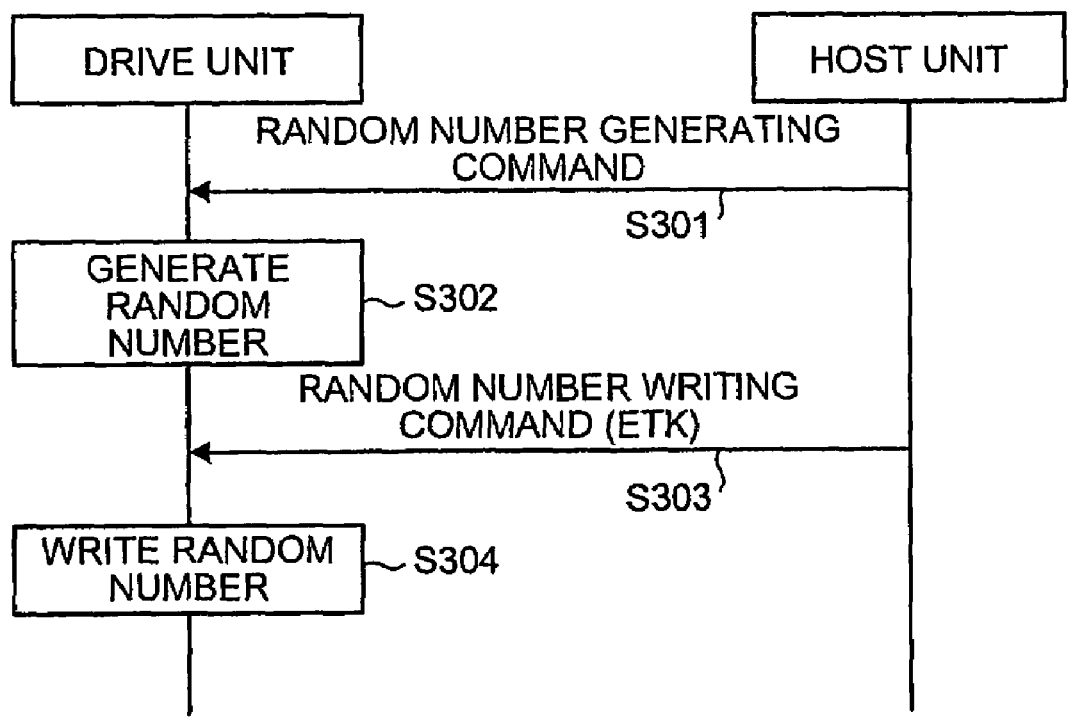
FIG. 3 is a sequence view showing a procedure of a process of writing a random number in a DVD medium.

A sector structure constituting data of the DVD medium 140 will be described below. The data is recorded in the DVD medium 140 while divided into pieces data having fixed lengths called sectors. Any piece of data on the DVD medium 140 is read and written in sector unit. FIG. 2 is an explanatory view showing a sector structure. As shown in FIG. 2, one sector includes a management sector header having a fixed length of M bytes and data having N bytes. The data is recorded in a user area which can be read and written with an arbitrary application, and a part of the sector header is recorded in a protected area where an arbitrary value cannot be written from the outside. A protocol shown in FIG. 3 can be used as a mechanism which enables an arbitrary value not to be written from the outside. FIG. 3 is a sequence view showing a procedure of the process of writing the random number in the DVD medium 140.

First, a random number generating command is transmitted from the host unit 120 to the drive unit 110 (Step S301). In the drive unit 110 which receives the random number generating command, the random number generating unit 111 generates the random number (Step S302), and the generated random number is temporarily stored in the random number generating unit 111. The host unit 120 transmits a random number writing command to the drive unit 110 (Step S303). At this point, a value of the random number is not included in the random number writing command. In the drive unit 110 which receives the random number writing command, the recording unit 113 writes the temporarily stored random number in the DVD medium 140 (Step S304). Thus, because the random number is not included in the random number writing command, a value except for the value generated by the drive unit 110 can be prevented from being written in the DVD medium 140.

Figure 4A:
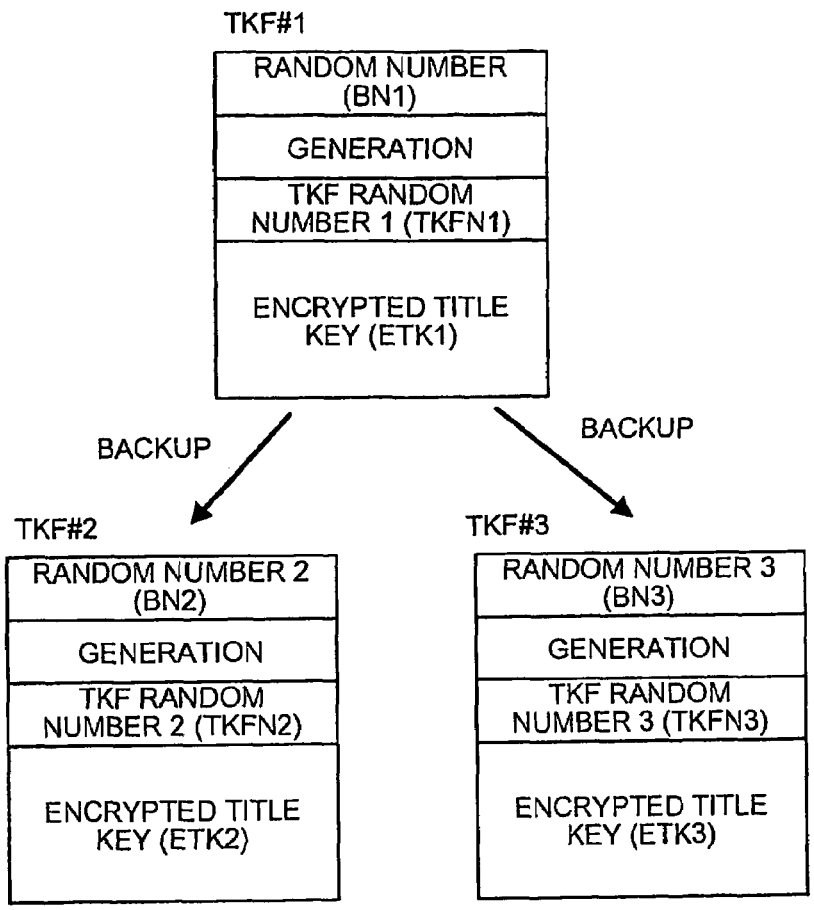
FIG. 4A is an explanatory view showing structures of a title key file and a backup file of the first embodiment.

A title key file backup of the first embodiment will be described below. FIG. 4A is an explanatory view showing structures of a title key file and a title key file which is of a backup file of the first embodiment. In the following description, for the sake of convenience, the title key files TKF#2 and TKF#3 which are of the backup file are simply referred to as backup files TKF#2 and TKF#3. In the first embodiment, the TKF initializing unit 141 generates the backup files as TKF#2 and TKF#3 of the title key file (TKF#1) recorded in the DVD medium 140, and the recording unit 113 of the drive unit 110 stores the three files TKF#1, TKF#2, and TKF#3 in the DVD medium 140.

Each of the title key file (TKF#1) and the backup files TKF#2 and TKF#3 has a configuration in which random numbers 1 to 3 (BN1, BN2, and BN3), a generation, TKF random numbers 1 to 3, and encrypted title keys (ETK 1 to 3) are registered. The random number generating unit 111 of the drive unit 110 randomly generates the random numbers 1 to 3 (BN1, BN2, and BN3) by receiving a demand of the host unit 120, and the recording unit 113 of the drive unit 110 records the random numbers 1 to 3 (BN1, BN2, and BN3) in the DVD medium 140. The generation indicates the number of changes of the title key file (TKF#1) and backup files TKF#2 and TKF#3.

The TKF random numbers 1 to 3 (TKFN1, TKFN2, and TKFN3) are random numbers which calculate the encrypted title key (ETK1, ETK2, and ETK3) of the file except for the TKF random numbers 1 to 3 (TKFN1, TKFN2, and TKFN3) of itself or the backup files respectively. The random number generating unit 125 of the drive unit 110 generates the TKF random numbers 1 to 3.

Figure 4B:
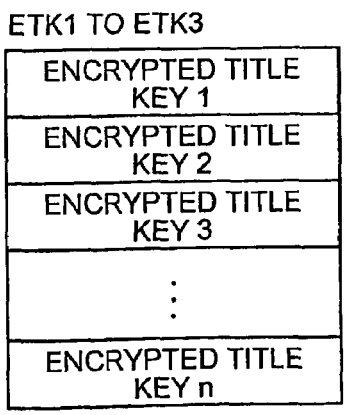
FIG. 4B is an explanatory view showing a data structure of an encrypted key file.

The encrypted title keys (ETK1, ETK2, and ETK3) are data in which all the title keys of the title key file are encrypted using the random numbers 1 to 3 (BN1, BN2, and BN3) registered in the title key file or the backup files and the associated TKF random numbers 1 to 3 (TKFN1, TKFN2, and TKFN3) registered in another file. FIG. 4B is an explanatory view showing a structure of the encrypted title keys (ETK1, ETK2, and ETK3). As shown in FIG. 4, each of the encrypted title keys (ETK1, ETK2, and ETK3) is one in which each of title keys 1 to n is encrypted. The encrypted title keys (ETK1, ETK2, and ETK3) are expressed by Formulas (1) to (3).

$$ETK1 = f(TK, BN1, TKFN3) \quad (1)$$

$$ETK2 = f(TK, BN2, TKFN1) \quad (2)$$

$$ETK3 = f(TK, BN3, TKFN2) \quad (3)$$

Where TK indicates a title key of a plaintext and f indicates that an encryption process is performed to a first parameter (TK) using a second parameter (BN1 to BN3) and a third parameter (TKFN1 to TKFN3) as an encryption key. A well-known encryption algorithm such as AES (Advanced Encryption Standard) may be used for the encryption process f.

TKF#1 is associated with TKF#3, and the title key (TK) is encrypted with the random number 1 (BN1) and the TKF random number 3 (TKFN3) of the associated TKF#3. TKF#2 is associated with TKF#1, and the title key (TK) is encrypted with the random number 2 (BN2) and the TKF random number 1 (TKFN1) of the associated TKF#1. TKF#3 is associated with TKF#2, and the title key (TK) is encrypted with the random number 3 (BN3) and the TKF random number 2 (TKFN2) of the associated TKF#2.

Thus, the title key file TKF#1 and the backup files TKF#2 and TKF#3 are mutually associated with other files, and the encryption title keys (ETK1, ETK2, and ETK3) become the title key in which the title key (TK) is encrypted with each of the random numbers 1 to 3 (BN1, BN2, and BN3) registered in the file of itself and each of the TKF random numbers 1 to 3 (TKFN1, TKFN2, and TKFN3) registered in other associated files, so that the title key (TK) cannot be reproduced even if a malicious third party copies one of the backup files.

The association of the title key file with the TKF random numbers of other files of the backup files is not limited to Formulas (1) to (3), but the title key file may be associated with the TKF random numbers of the backup files using other patterns except for Formulas (1) to (3).

Here, the random numbers 1 to 3 (BN1, BN2, and BN3) are recorded in the protected area shown in FIG. 3 of the sector where the title key file TKF#1 and the backup files TKF#2 and TKF#3 are recorded. On the other hand, the TKF random numbers 1 to 3 (TKFN1, TKFN2, and TKFN3) are recorded in the user area where the title key file TKF#1 and the backup file TKF#2 and TKF#3 are recorded. Therefore, although a user cannot record an arbitrary value in the random numbers 1 to 3 (BN1, BN2, and BN3), sometimes an arbitrary value is written in the TKF random numbers 1 to 3 (TKFN1, TKFN2, and TKFN3) by an application such as an editor in which a key management process is not performed. In the first embodiment, in the case where edit (writing) is performed into the title key file TKF#1 and the backup files TKF#2 and TKF#3 by a general application which the key management process is not performed, the recording unit 113 is adapted to write "0" of improper information in the random numbers 1 to 3. For example, the recording unit 113 sets "0" to BN1 in the case where a value is written in TKFN1 of TKF#1 by the application in which the key management process is not performed. The same holds for TKF#2 and TKF#3.

Then, a title-key file backup process performed by the contents recording and reproducing apparatus 100 of the first embodiment having the above configuration will be described below. First, a process of initializing a title key file (TKF) backup will be described. FIG. 5 is a flowchart showing a procedure of the process of initializing the title key file (TKF) backup.

First the host unit 120 generates the title key (TK). The TKF initializing unit 141 causes the random number generating unit 125 to randomly generate the TKF random numbers 1 to 3 (TKFN1, TKFN2, and TKFN3) (Step S501) and to randomly generate the generation (Step S502).

Then, the TKF initializing unit 141 obtains the random number 1 (BN1) retained in the drive unit 110 (Step S503). Generating and obtaining the random number 1 is performed by the method shown in FIG. 3. The generated title key is encrypted with the random number 1 (BN1) and the associated TKF random number 3 (TKFN3) to generate the encryption title key (ETK1) according to Formula (1) (Step S504). The TKF initializing unit 141 generates the title key file TKF#1 from the random number 1 (BN1), the TKF random number 1 (TKFN1), the generation, and the generated encrypted title key (ETK1) (Step S505). The TKF initializing unit 141 transmits the generated title key file TKF#1 to the drive unit 110, and the recording unit 113 records the title key file TKF#1 in the DVD medium 140 (Step S506).

Then, the TKF initializing unit 141 obtains the random number 2 (BN2) retained in the drive unit 110 (Step S507). Generating and obtaining the random number 2 is performed by the method shown in FIG. 3. The title key (TK) is encrypted with the random number 2 (BN2) and the associated TKF random number 1 (TKFN1) to generate the encrypted title key (ETK2) according to Formula (2) (Step S508). The TKF initializing unit 141 generates the backup file TKF#2 from the random number 2 (BN2), the TKF random number 2 (TKFN2), the generation, and the generated encrypted title key (ETK2) (Step S509). The TKF initializing unit 141 transmits the generated backup file TKF#2 to the drive unit 110, and the recording unit 113 records the backup file TKF#2 in the DVD medium 140 (Step S510).

Then, the TKF initializing unit 141 obtains the random number 3 (BN3) retained in the drive unit 110 (Step S511). Generating and obtaining the random number 3 is performed by the method shown in FIG. 3. The title key (TK) is encrypted with the random number 3 (BN3) and the associated TKF random number 2 (TKFN2) to generate the encrypted title key (ETK3) according to Formula (3) (Step S512). The TKF initializing unit 141 generates the backup file TKF#3 from the random number 3 (BN3), the TKF random number 3 (TKFN3), the generation, and the generated encrypted title key (ETK3) (Step S513). The TKF initializing unit 141 transmits the generated backup file TKF#3 to the drive unit 110, and the recording unit 113 records the backup file TKF#3 in the DVD medium 140 (Step S514). Thus, the title key on the DVD medium 140 is stored in the three files.

The process of updating the title key file (TKF) backup will be described below. FIG. 6A is a flowchart showing a procedure of the process of updating the title key file (TKF) backup. The backup file updating process is performed in the case where the list of the title key (TK) is updated by deleting or adding the title contents of the DVD medium 140. At this time, the readout unit 112 reads the title key (TKF#1) and the two backup files TKF#2 and TKF#3 from the DVD medium 140. It is checked whether or not all the generation field values of the title key file (TKF#1) and the two backup files TKF#2 and TKF#3 coincide with each other. When the generation field values do not coincide with each other, a later-mentioned recovering process is performed. When the generation field values coincide with each other, the following process is continued. The TKF updating unit 142 obtains the random number 1 (BN1) recorded on the DVD medium 140 from the readout unit 112 of the drive unit 110 (Step S601). The encryption title key (ETK1) of the title key file TKF#1 is decoded with the random number 1 (BN1) and the associated TKF random number #3 (Step S602) according to Formula (1) to obtains the title key (TK). The TKF updating unit 142 randomly generates the new TKF random numbers 1 to 3 (TKFN1, TKFN2, and TKFN3) (Step S603), and the TKF updating unit 142 updates the generation by incrementing the generation by one (Step S604).

The TKF updating unit 142 requests the drive unit 110 to generate the random number, and the TKF updating unit 142 obtains the new random number 1 (BN1), re generated by the random number generating unit 111, from the drive unit 110 (Step S605). The TKF updating unit 142 encrypts the title key (TK) with the new random number 1 (BN1) and the newly associated TKF random number 3 (TKFN3) to generate the encrypted title key (ETK1) according to Formula (1) (Step S606). The TKF updating unit 142 generates the title key file TKF#1 from the new random number 1 (BN1), the new TKF random number 1 (TKFN1), the updated generation, and the generated encrypted title key (ETK1) (Step S607) to update TKF#1. The TKF updating unit 142 transmits the updated title key file TKF#1 to the drive unit 110, and the recording unit 113 records the title key file TKF#1 in the DVD medium 140 (Step S608).

Figure 6B:
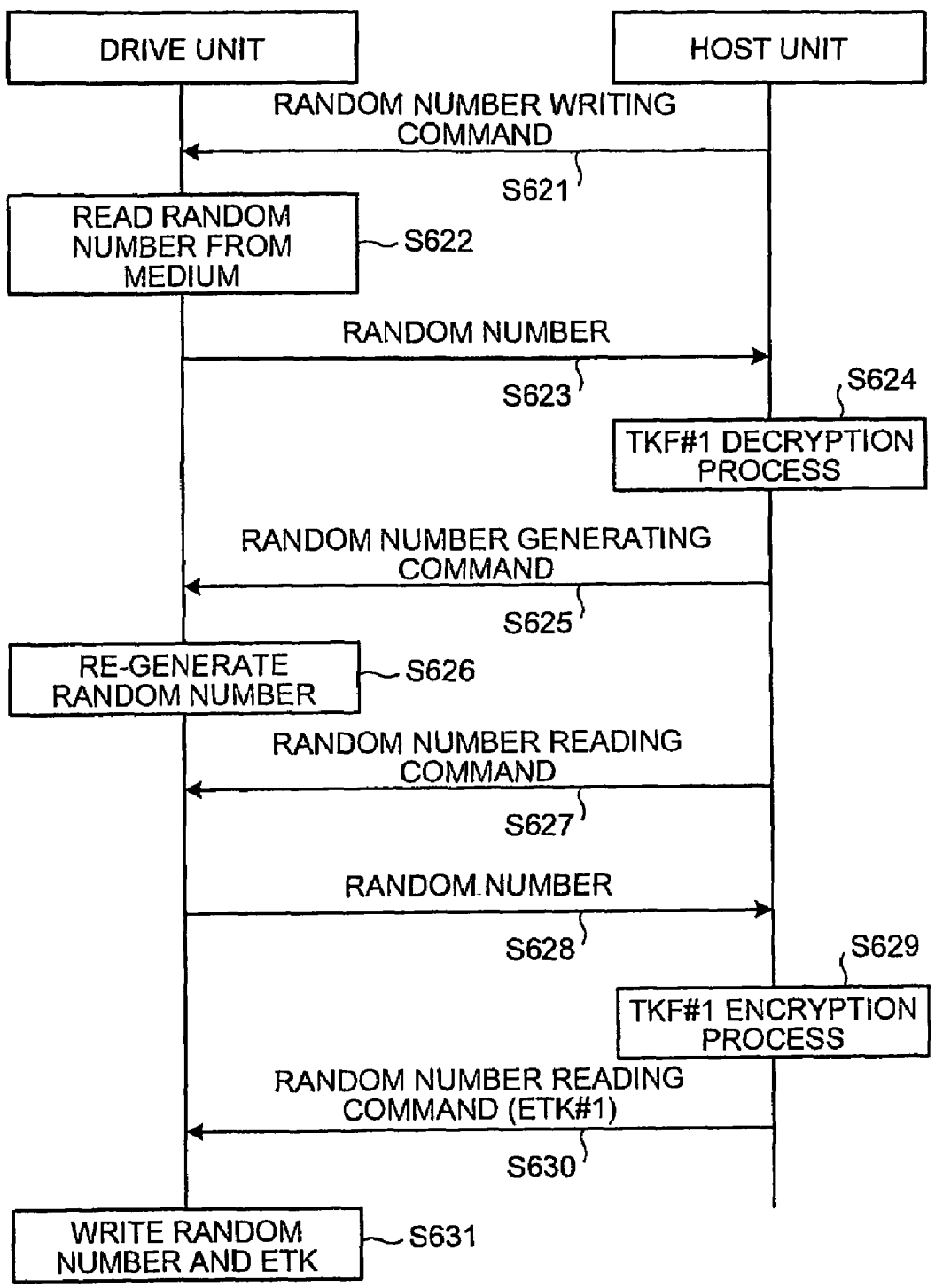
FIG. 6B is a sequence view showing a procedure of writing a title key file TKF#1 and a re-generated random number 1 in the DVD medium after the title key file TKF#1 is decrypted and encrypted by the re-generated random number 1.

The process from Steps S601 to S607 will be described while focusing attention on data transmission and reception between the host unit 120 and the drive unit 110. FIG. 6B is a sequence view showing a procedure of writing the title key file TKF#1 and the re-generated random number 1 in the DVD medium after the title key file TKF#1 is decrypted and encrypted by the re-generated random number 1. The host unit 120 transmits a random number reading command to the drive unit 110 (Step S621). When the drive unit 110 receives the random number reading command, the drive unit 110 causes the readout unit 112 to read the random number 1 from the DVD medium 140 (Step S622). The drive unit 110 transmits the random number 1 read from the DVD medium 140 to the host unit 120 (Step S623). The host unit 120 which receives the random number 1 performs a TKF#1 decryption process (Step S624).

Then, the host unit 120 transmits the random number generating command to the drive unit 110 (Step S625). When the drive unit 110 receives the random number generating command, the drive unit 110 causes the random number generating unit 111 to re-generate the random number 1 (Step S626), and the re-generated random number 1 is temporarily stored in the drive unit 110. When the host unit 120 transmits the random number reading command to the drive unit 110 (Step S627), the drive unit 110 transmits the temporarily stored random number 1 to the host unit 120 (Step S628).

The host unit 120 which receives the re-generated random number 1 performs the TKF#1 encrypting process using the re-generated random number 1 (Step S629). When the TKF#1 encrypting process is ended, the host unit 120 transmits the random number writing command (ETK1) to the drive unit 110 (Step S630). When the drive unit 110 receives the random number writing command, the recording unit 113 writes the random number 1 and ETK1 in the DVD medium 140 (Step S630).

When TKF#1 and the random number 1 are written in the DVD medium 140, the flow returns to FIG. 6A. The TKF updating unit 142 requests the drive unit 110 to generate the random number, and the TKF updating unit 142 obtains the new random number 2 (BN2), re-generated by the random number generating unit 111, from the drive unit 110 (Step S609). The TKF updating unit 142 encrypts the title key (TK) with the new random number 2 (BN2) and the newly associated TKF random number 1 (TKFN1) to generate the encrypted title key (ETK2) according to Formula (2) (Step S610). The TKF updating unit 142 generates the backup key file TKF#2 from the new random number 2 (BN2), the new TKF random number 2 (TKFN2), the updated generation, and the generated encrypted title key (ETK2) (Step S611) to update TKF#2. The TKF updating unit 142 transmits the updated title key file TKF#2 to the drive unit 110, and the recording unit 113 records the title key file TKF#2 in the DVD medium 140 (Step S612).

Then, the TKF updating unit 142 requests the drive unit 110 to generate the random number, and the TKF updating unit 142 obtains the new random number 3 (BN3), re-generated by the random number generating unit 111, from the drive unit 110 (Step S613). The TKF updating unit 142 encrypts the title key (TK) with the new random number 3 (BN3) and the newly associated TKF random number 2 (TKFN2) to generate the encrypted title key (ETK3) according to Formula (3) (Step S614). The TKF updating unit 142 generates the backup file TKF#3 from the new random number 3 (BN2), the new TKF random number 3 (TKFN3), the updated generation, and the generated encrypted title key (ETK3) (Step S615) to update TKF#3. The TKF updating unit 142 transmits the updated backup file TKF#3 to the drive unit 110, and the recording unit 113 records the title key file TKF#3 in the DVD medium 140 (Step S616). Thus, the title key file TKF#1 and the backup files TKF#2 and TKF#3 are updated, and TKF#1, TKF#2, and TKF#3 are sequentially written in the DVD medium 140. The title key file and the backup files are written in the DVD medium 140 in the above order, which allows the determination whether the backup file recovery is required or not to be made by agreement or disagreement between the generations.

Figure 7:
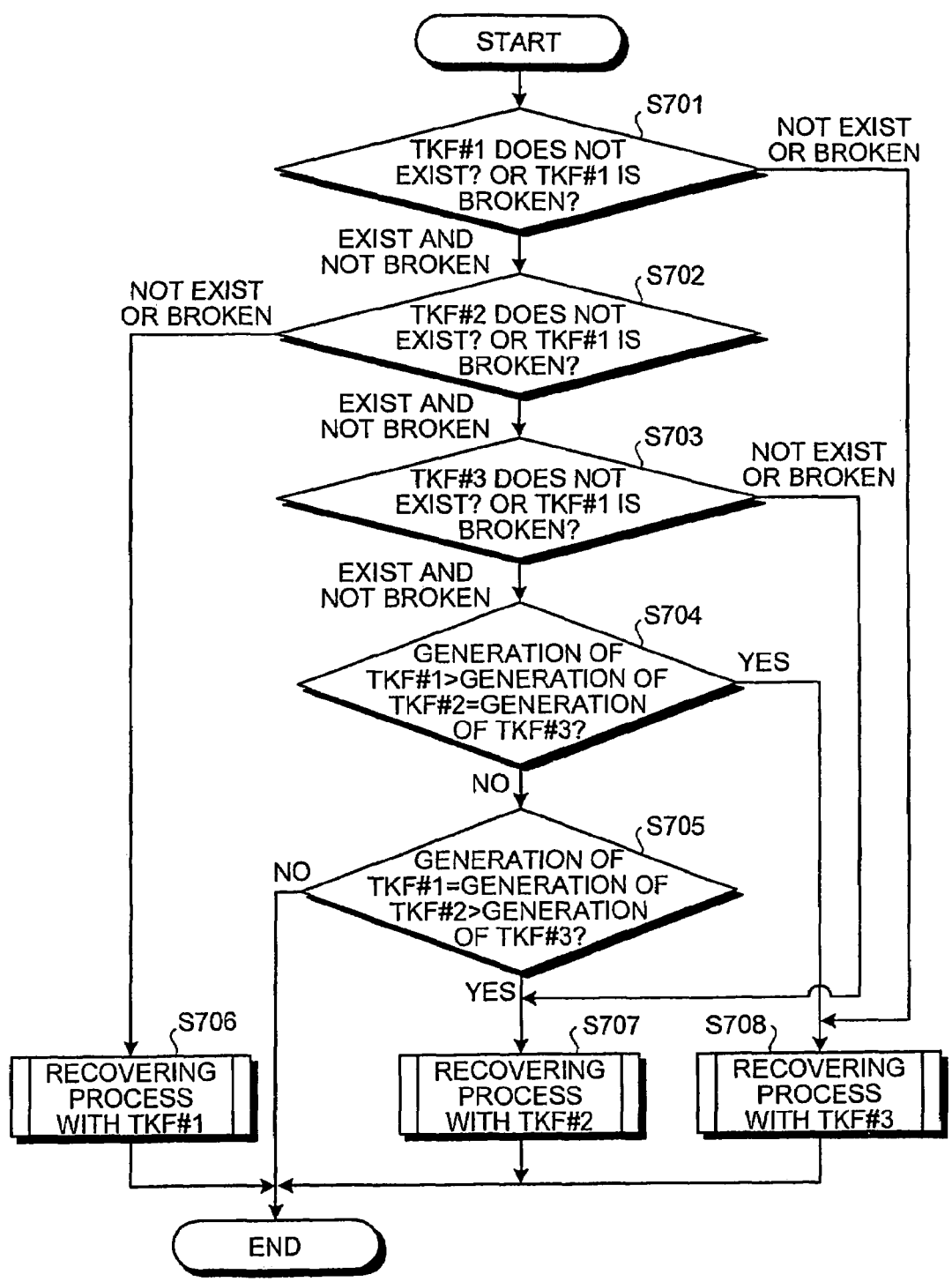
FIG. 7 is a flowchart showing a whole procedure of a process of recovering the title key file (TKF) backup.

A backup recovering process for the title key file (TKF#1) and the backup files (TKF#2 and TKF#3) will be described below. FIG. 7 is a flowchart showing a whole procedure of the process of recovering the title key file (TKF#1) backup.

The backup file recovering process is performed, in the case where one of the title key file TKF#1 and the backup files TKF#2 and TKF#3 does not exist in the DVD medium 140, or in the case where one of the title key file TKF#1 and the backup files TKF#2 and TKF#3 is broken, or in the case where the generation of the three files TKF#1, TKF#2, and TKF#3 do not coincide with each other. Specifically the backup file recovering process is performed by the following determination.

The readout unit 112 reads the title key file TKF#1 and the backup files TKF#2 and TKF#3 from the DVD medium 140, and the TKF recovering unit 143 checks whether the title key file TKF#1 does not exist or whether the title key file TKF#1 is broken (Step S701). When the title key file TKF#1 does not exist or is broken (NOT EXIST OR BROKEN in Step S701), the recovering process is performed by the backup file TKF#3 (Step S708).

On the other hand, in Step S701, when the title key file TKF#1 exists and is not broken (EXIST AND NOT BROKEN in Step S701), the TKF recovering unit 143 checks whether the backup file TKF#2 does not exist or whether the backup file TKF#2 is broken (Step S702). When the backup file TKF#2 does not exist or is broken (NOT EXIST OR BROKEN in Step S702), the recovering process is performed by the title key file TKF#1 (Step S706).

On the other hand, in Step S702, when the backup file TKF#2 exists and is not broken (EXIST AND NOT BROKEN in Step S702), the TKF recovering unit 143 checks whether the backup file TKF#3 does not exist or whether the backup file TKF#3 is broken (Step S703). When the backup file TKF#3 does not exist or is broken (NOT EXIST OR BROKEN in Step S703), the recovering process is performed by the title key file TKF#2 (Step S707).

On the other hand, in Step S703, when the backup file TKF#3 exists and is not broken (EXIST AND NOT BROKEN in Step S703), the TKF recovering unit 143 checks whether the generation of TKF#1 is larger than the generation of TKF#2 (Step S704). When the generation of TKF#1 is larger than the generation of TKF#2 (=generation of TKF#3) (Yes in Step S704), the TKF recovering unit 143 determines that the updating process is interrupted after TKF#1 is updated and before TKF#2 is updated due to power-off of the contents recording and reproducing apparatus 100, and the TKF recovering unit 143 performs the recovering process using TKF#3 (Step S708).

On the other hand, in Step S704, when the generation of TKF#1 is not larger than the generation of TKF#2 (=generation of TKF#3) (No in Step S704), the TKF recovering unit 143 checks whether the generation of TKF#3 is smaller than the generation of TKF#2 (=generation of TKF#1) (Step S705). When the generation of TKF#3 is smaller than the generation of TKF#2 (=generation of TKF#1) (Yes in Step S704), the TKF recovering unit 143 determines that the updating process is interrupted after TKF#2 is updated and before TKF#3 is updated due to the power-off of the contents recording and reproducing apparatus 100, and the TKF recovering unit 143 performs the recovering process using TKF#2 (Step S707).

On the other hand, in Step S705, when the generation of TKF#3 is not smaller than the generation of TKF#2 (=generation of TKF#1) (No in Step S705), the backup files exist and are not broken, and the updating process is not interrupted during the update. Therefore, the TKF recovering unit 143 determines that it is not necessary to recover the backup file, and the flow is ended without performing the recovering process.

Figure 8:
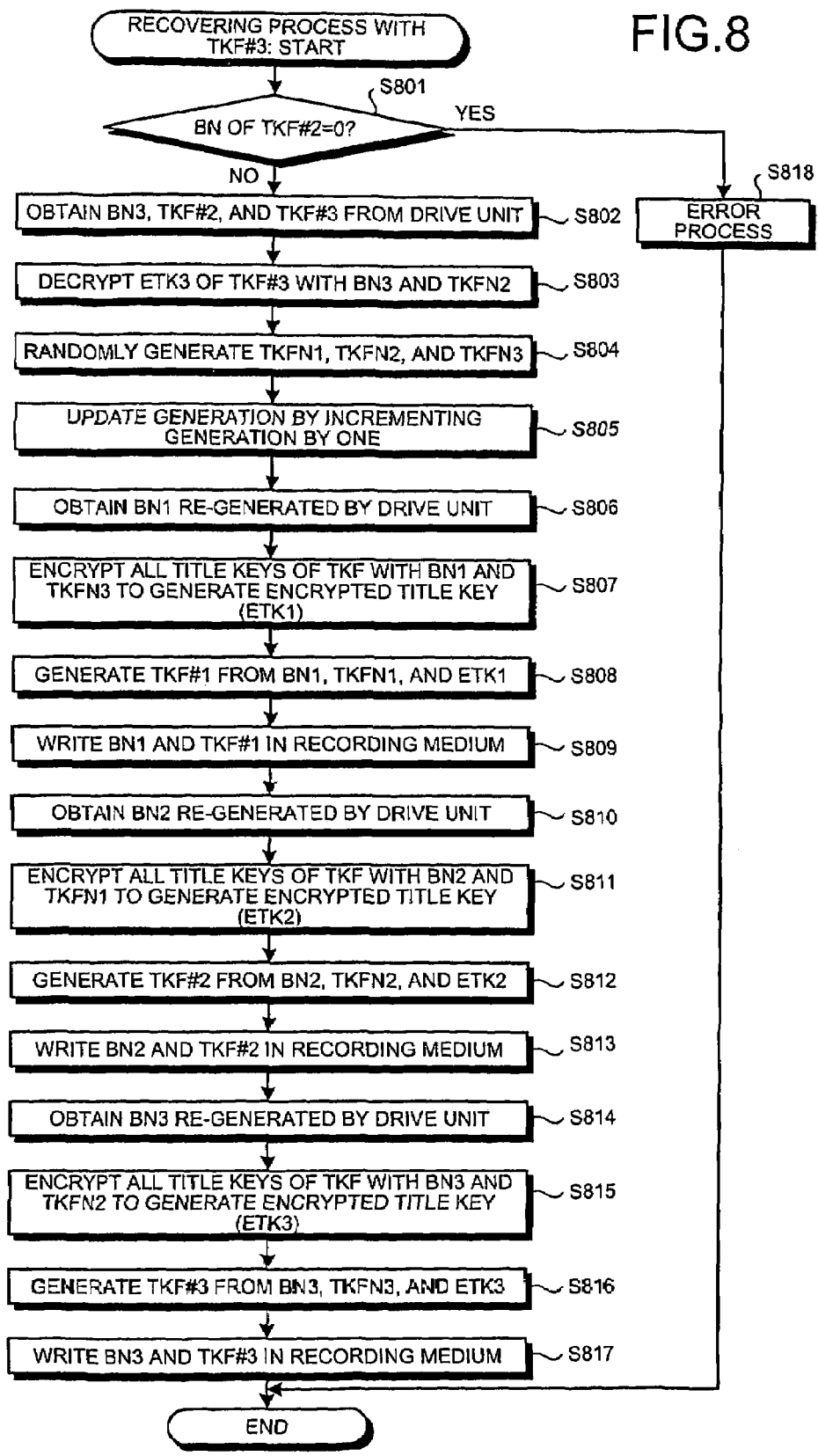
FIG. 8 is a flowchart showing a procedure of a recovering process performed by a backup file TKF#3.

The recovering process performed by the backup file TKF#3 in Step S708 will be described below. FIG. 8 is a flowchart showing a procedure of the recovering process performed by the backup file TKF#3.

In the case where TKF#1 does not exist or is broken, or in the case where the generation of TKF#1 is larger than the generations of TKF#2 and TKF#3, the TKF recovering unit 143 decrypts the encrypted title key (ETK3) with TKF#3 from Formula (3) to obtain the title key (TK) and the TKF recovering unit 143 performs the recovering process for TKF#1, TKF#2, and TKF#3 from the title key (TK).

Therefore, at first, the TKF recovering unit 143 checks whether or not "0" which is of the improper information is set in the protect area where the random number 2 (BN2) of TKF#2 is stored (Step S801). When "0" is set in the random number 2 (BN2) of TKF#2 (Yes in Step S801), for example, the value of TKFN2 stored in the user area of TKF#2 is changed by an application such as editor. In this case, because the improper update exists, the TKF recovering unit 143 performs an error process (Step S818), and the flow is ended without performing the recovering process.

On the other hand, in Step S801, when "0" is not set in the protect area where the random number 2 (BN2) of TKF#2 is stored (No in Step S801), the TKF recovering unit 143 determines that TKF#2 is proper, and the TKF recovering unit 143 continues the following recovering process.

The TKF recovering unit 143 obtains the random number 3 (BN3) and TKF#2 and TKF#3, recorded on the DVD medium 140, from the drive unit 110 (Step S802). The TKF recovering unit 143 decrypts the encrypted title key (ETK3) of the backup file TKF#3 with the random number 3 (BN3) and the associated TKF random number 2 (TKFN2) according to Formula (3) (Step S803) to obtain the title key (TK). The TKF updating unit 142 randomly generates the new TKF random numbers 1 to 3 (TKFN1, TKFN2, and TKFN3) (Step S804), and the TKF updating unit 142 updates the generation by incrementing the generation by one (Step S805).

Then, the TKF recovering unit 143 requests the drive unit 110 to generate the random number, and the TKF recovering unit 143 obtains the new random number 1 (BN1), re-generated by the random number generating unit 111, from the drive unit 110 (Step S806). The TKF recovering unit 143 encrypts the title key (TK) with the new random number 1 (BN1) and the newly associated TKF random number 3 (TKFN3) to generate the encrypted title key (ETK1) according to Formula (1) (Step S807). The TKF recovering unit 143 generates the title key file TKF#1 from the new random number 1 (BN1), the new TKF random number 1 (TKFN1), the updated generation, and the generated encrypted title key (ETK1) (Step S808) to recover TKF#1. The TKF recovering unit 143 transmits the recovered title key file TKF#1 to the drive unit 110, and the recording unit 113 records the title key file TKF#1 and the random number 1 (BN1) in the DVD medium 140 (Step S809).

Then, the TKF recovering unit 143 requests the drive unit 110 to generate the random number, and the TKF recovering unit 143 obtains the new random number 2 (BN2), re-generated by the random number generating unit 111, from the drive unit 110 (Step S810). The TKF recovering unit 143 encrypts the title key (TK) with the new random number 2. (BN2) and the newly associated TKF random number 1 (TKFN1) to generate the encrypted title key (ETK2) according to Formula (2) (Step S811). The TKF recovering unit 143 generates the backup file TKF#2 from the new random number 2 (BN2), the new TKF random number 2 (TKFN2), the updated generation, and the generated encrypted title key (ETK2) (Step S812) to recover TKF#2. The TKF recovering unit 143 transmits the recovered backup file TKF#2 to the drive unit 110, and the recording unit 113 records the title key file TKF#2 and the random number 2 (BN2) in the DVD medium 140 (Step S813).

Then, the TKF recovering unit 143 requests the drive unit 110 to generate the random number, and the TKF recovering unit 143 obtains the new random number 3 (BN3), re-generated by the random number generating unit 111, from the drive unit 110 (Step S814). The TKF recovering unit 143 encrypts the title key (TK) with the new random number 3 (BN3) and the newly associated TKF random number 2 (TKFN2) to generate the encrypted title key (ETK3) according to Formula (3) (Step S815). The TKF recovering unit 143 generates the backup file TKF#3 from the new random number 3 (BN3), the new TKF random number 3 (TKFN3), the updated generation, and the generated encrypted title key (ETK3) (Step S816) to recover TKF#3. The TKF recovering unit 143 transmits the recovered backup file TKF#3 to the drive unit 110, and the recording unit 113 records the backup file TKF#3 and the random number 3 (BN3) in the DVD medium 140 (Step S817). Thus, all the backup files are recovered using TKF#3.

Figure 9:
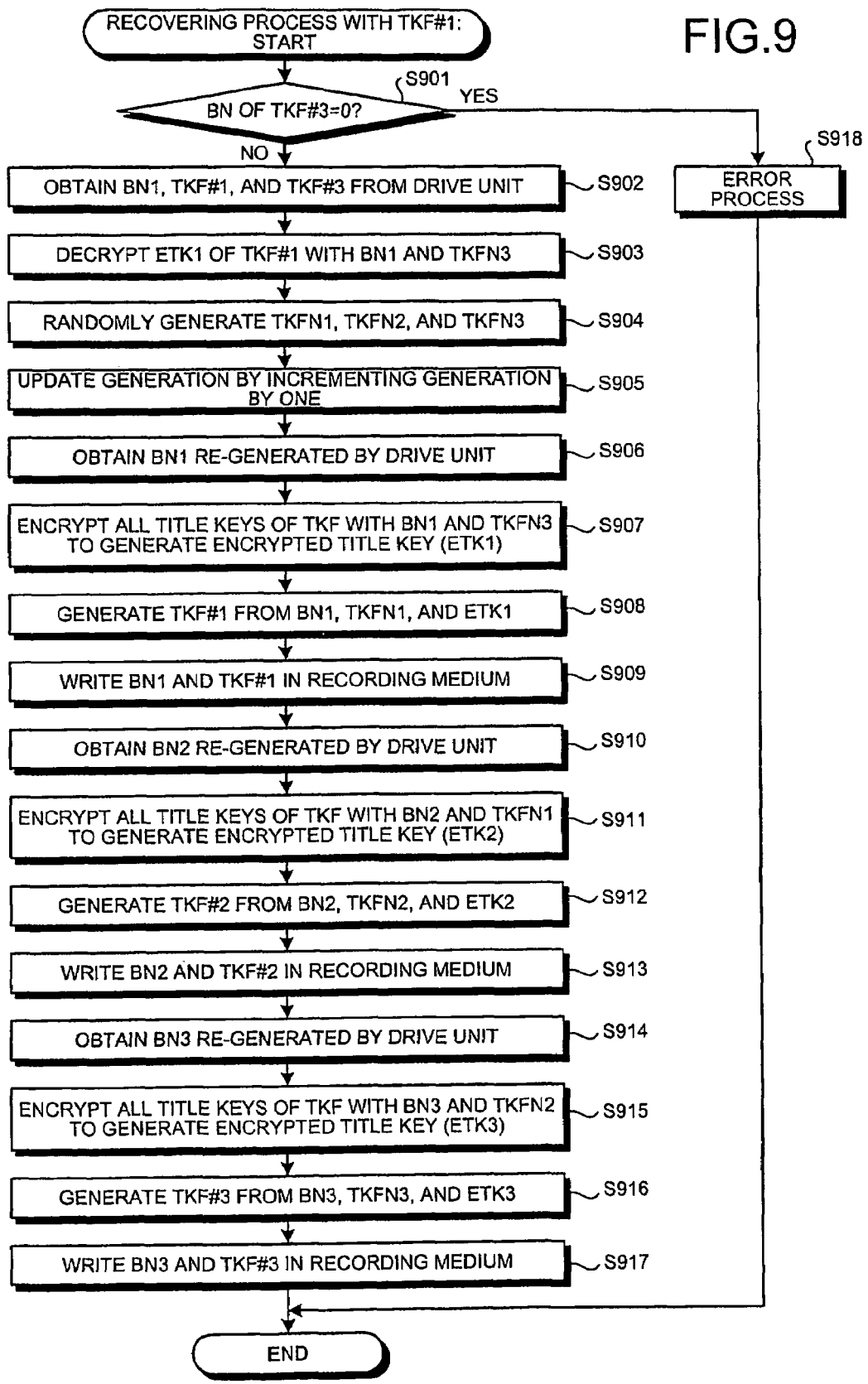
FIG. 9 is a flowchart showing a procedure of a recovering process performed by a backup file TKF#1.

The recovering process in Step S706 performed by the title key file TKF#1 will be described below. FIG. 9 is a flowchart showing a procedure of the recovering process performed by the title key file TKF#1.

When TKF#2 does not exist or is broken, the TKF recovering unit 143 decrypts the encrypted title key (ETK1) with TKF#1 to obtain the title key (TK), and the TKF recovering unit 143 performs the recovering process for TKF#1, TKF#2, and TKF#3 from TK.

Therefore, at first, the TKF recovering unit 143 checks whether or not "0" which is of the improper information is set to the random number 3 (BN3) of TKF#3 (Step S901). When "0" is set in the random number 3 (BN2) of TKF#3 (Yes in Step S901), for example, the value of TKFN3 stored in the user area of TKF#3 is changed by an application such as editor. In this case, because the improper update exists, the TKF recovering unit 143 performs the error process (Step S918), and the flow is ended without performing the recovering process.

On the other hand, in Step S901, when "0" is not set to the random number 3 (BN3) of TKF#3 (No in Step S901), the TKF recovering unit 143 determines that TKF#3 is proper, and the TKF recovering unit 143 continues the following recovering process.

The TKF recovering unit 143 obtains the random number 1. (BN1) and TKF#1 and TKF#3, recorded on the DVD medium 140, from the drive unit 110 (Step S902). The TKF recovering unit 143 decrypts the encrypted title key (ETK1) of the title key file TKF#1 with the random number 1 (BN1)

and the associated TKF random number 3 (TKFN3) according to Formula (1) (Step S903) to obtain the title key (TK). The TKF updating unit 142 randomly generates the new TKF random numbers 1 to 3 (TKFN1, TKFN2, and TKFN3) (Step S904), and the TKF updating unit 142 updates the generation by incrementing the generation by one (Step S905).

The TKF#1, TKF#2, and TKF#3 recovering process from Step S906 to Step S917 is similar to the process from Step S906 to Step S917 shown in FIG. 8. Thus, all the backup files are recovered using TKF#1.

Figure 10:
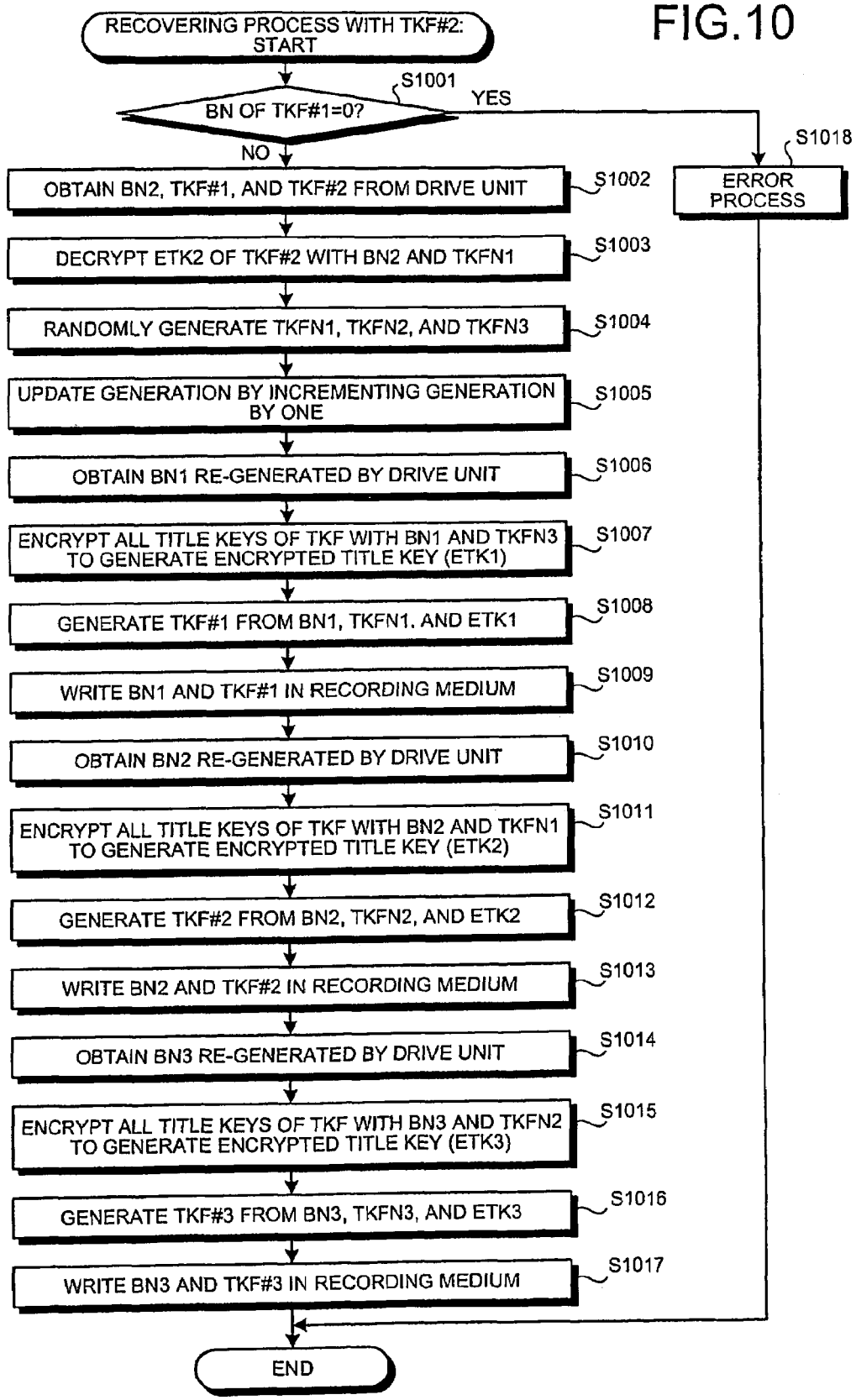
FIG. 10 is a flowchart showing a procedure of a recovering process performed by a backup file TKF#2.

The recovering process in Step S707 performed by the backup file TKF#2 will be described below. FIG. 10 is a flowchart showing a procedure of the recovering process performed by the backup file TKF#2.

When TKF#3 does not exist or is broken, or when the generation of TKF#3 is smaller than the generations of TKF#2 and TKF#1, the TKF recovering unit 143 decrypts the encrypted title key (ETK2) with TKF#2 to obtain the title key file (TKF), and the TKF recovering unit 143 performs the recovering process for TKF#1, TKF#2, and TKF#3 from TKF.

Therefore, at first, the TKF recovering unit 143 checks whether or not "0" which is of the improper information is set to the random number 1 (BN1) of TKF#1 (Step S1001). When "0" is set in the random number 1 (BN1) of TKF#1 (Yes in Step S1001), for example, the value of TKFN1 stored in the user area of TKF#1 is changed by an application such as editor. In this case, because the improper update exists, the TKF recovering unit 143 performs the error process (Step S1018), and the flow is ended without performing the recovering process.

On the other hand, in Step S1001, when "0" is not set to the random number 1 (BN1) of TKF#1 (No in Step S1001), the TKF recovering unit 143 determines that TKF#1 is proper, and the TKF recovering unit 143 continues the following recovering process.

The TKF recovering unit 143 obtains the random number 2 (BN2) and TKF#2 and TKF#1, recorded on the DVD medium 140, from the drive unit 110 (Step S1002). The TKF recovering unit 143 decrypts the encrypted title key (ETK2) of the backup file TKF#2 with the random number 2 (BN2) and the associated TKF random number 1 (TKFN1) according to Formula (2) (Step S1003) to obtain the title key (TK). The TKF updating unit 142 randomly generates the new TKF random numbers 1 to 3 (TKFN1, TKFN2, and TKFN3) (Step S1004), and the TKF updating unit 142 updates the generation by incrementing the generation by one (Step S1005).

The TKF#1, TKF#2, and TKF#3 recovering process in Steps S1006 and S1017 is similar to the process in Steps S906 and S917 shown in FIG. 8. Thus, all the backup files are recovered using TKF#2.

As described above, in the first embodiment, three encrypted files of the title key (TK) are prepared, and each encrypted title key is encrypted using the random number of itself and the TKF random number of another file associated with the random number of itself according to each of Formulas (1) to (3). For example, an attacker previously copies one backup file in another medium, the attacker moves a part of the title contents to another medium to update the title key file in a normal procedure, the attacker deletes the title key file from the DVD medium to restore the backup file copied in another medium, in the DVD medium. Even in this case, the title key cannot be decrypted according to Formulas (1) to (3) when at least two files exist. Further, other two files are updated by the updating process. Therefore, the title key cannot be restored. Accordingly, the improper restoration of the title key for the title contents deleted from the DVD medium can be prevented, and the unauthorized use of the title contents can be prevented.

For example, even in the case where the attacker previously renames one backup file to store the backup file in the DVD medium, "0" which is of the improper information is set to the random numbers 1 to 3 recorded in the protect area when an application except for the application for producing the title key file edits the title key file. Therefore, the improper backup file recovering process is not performed, and the title key cannot be restored. Accordingly, the unauthorized use of the title contents can be prevented.

(Modification)

Figure 11:
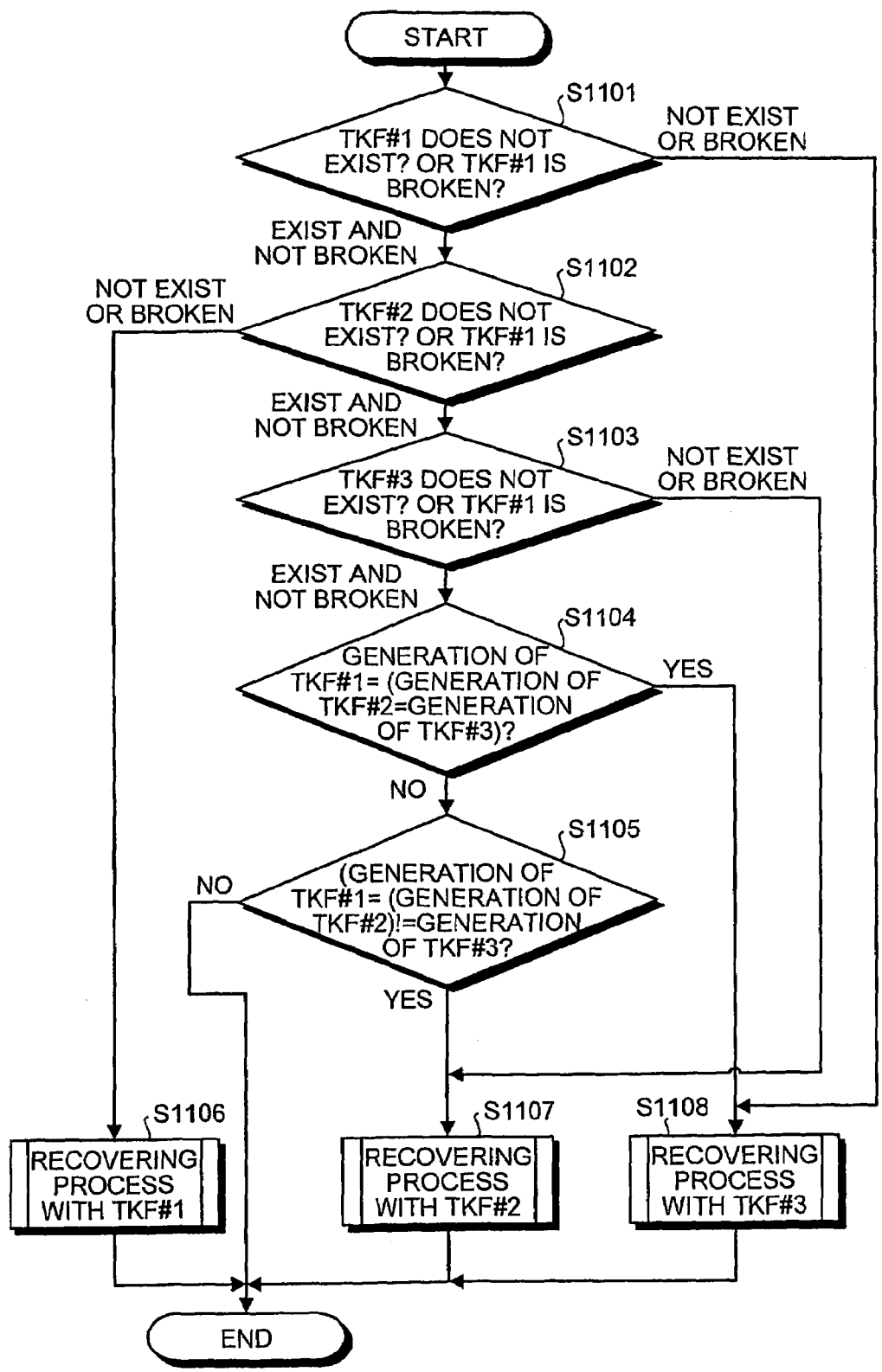
FIG. 11 is a flowchart showing a whole procedure of a process of initializing the title key file (TKF) backup in the case where a random number is generated in each time when a generation is updated.

In the first embodiment, the generations of the title key file TKF#1 and the backup files TKF#2 and TKF#3 are randomly generated in the initialization, and the generation is incremented by one as part of the updating process in each time when the title key list is changed by deleting or adding the title contents. However, the invention is not limited to the first embodiment, but the generation may randomly be generated in each updating process. FIG. 11 is a flowchart showing a whole procedure of the process of initializing the title key file (TKF) backup in the case where the random number is generated in each time when the generation is updated.

The whole backup restoring process shown in FIG. 11 differs from the whole process shown in FIG. 7 only in Steps S1104 and S1105. That is, in Step S1104, although values of the generations of TKF#2 and TKF#3 coincide with each other, it is determined whether or not values of the generations of TKF#2 and TKF#3 coincide with a value of the generation of TKF#1. In Step S1105, although values of the generations of TKF#1 and TKF#2 coincide with each other, it is determined whether or not values of the generations of TKF#1 and TKF#2 coincide with a value of the generation of TKF#3. This is because the generations are randomly generated in each updating process in the modification.

Second Embodiment

As shown in FIG. 4A, the title key file TKF#1 and the backup files TKF#2 and TKF#3 have the same structure in the first embodiment. However in a second embodiment, the backup file TKF#3 differs from the title key file TKF#1 and the backup file TKF#2 in the structure.

The recording and reproducing apparatus of the second embodiment has the same configuration as the recording and reproducing apparatus of the first embodiment described with reference to FIG. 1.

FIG. 12 is an explanatory view showing structures of a title key file and a backup file of the second embodiment. In the second embodiment, the backup file TKF#3 does not have the encrypted title key and the TKF random number 3, but the backup file TKF#3 has the TKF random number 1 (TKFN1) and TKF random number 2 (TKFN2). Further, the second embodiment differs from the first embodiment in the method of computing the encrypted title key (ETK1) of the title key file TKF#1 and the encrypted title key (ETK2) of the backup file TKF#2.

Similarly to TKF#1 and TKF#2 of the first embodiment, the title key file TKF#1 and the backup file TKF#2 include the random numbers 1 and 2 (BN1 and BN2), the generations, the TKF random numbers 1 and 2 (TKFN1 and TKFN2), and the encrypted title keys (ETK1 and ETK2), respectively. The TKF random number 1 (TKFN1) of TKF#1 is a random number for calculating the encrypted title key (ETK2) of the backup file TKF#2 except for TKF#1 of itself. The TKF random number 2 (TKFN2) of TKF#2 is a random number for calculating the encrypted title key (ETK1) of the backup file TKF#1 except for TKF#2 of itself.

The backup file TKF#3 has the structure different from TKF#1 and TKF#2, and the backup file TKF#3 includes the random number 3 (BN3), the generation, the TKF random number 1 (TKFN1), and the TKF random number 2 (TKFN2). In the TKF random numbers of TKF#3, the same value as the TKF random number 1 (TKFN1) of the title key file TKF#1 is recorded in TKFN1, and the same value as the TKF random number 2 (TKFN2) of the backup file TKF#2 is recorded in TKFN2.

The encrypted title keys (ETK1 and ETK2) are data in which all the title keys of the title key file are encrypted with the random numbers (BN1 and BN2) registered in the title key file TKF#1 or the backup files TKF#2 and TKF#3, and the associated TKF random numbers (TKFN1 and TKFN2) registered in another file. The encrypted title keys (ETK1 and ETK2) are expressed by Formulas (4) and (5).

$$ETK1 = f(TK, BN1, TKFN2) \quad (4)$$

$$ETK2 = f(TK, BN2, TKFN1) \quad (5)$$

Where TK indicates a title key and f indicates that an encryption process is performed to a first parameter (TK) using a second parameter (BN1, BN2) and a third parameter (TKFN1, TKFN2) as the encrypted key. A well-known encryption algorithm such as AES (Advanced Encryption Standard) may be used for the encryption process f.

The title key file backup process performed by the contents recording and reproducing apparatus 100 of the second embodiment having the above configuration will be described below.

Figure 13:
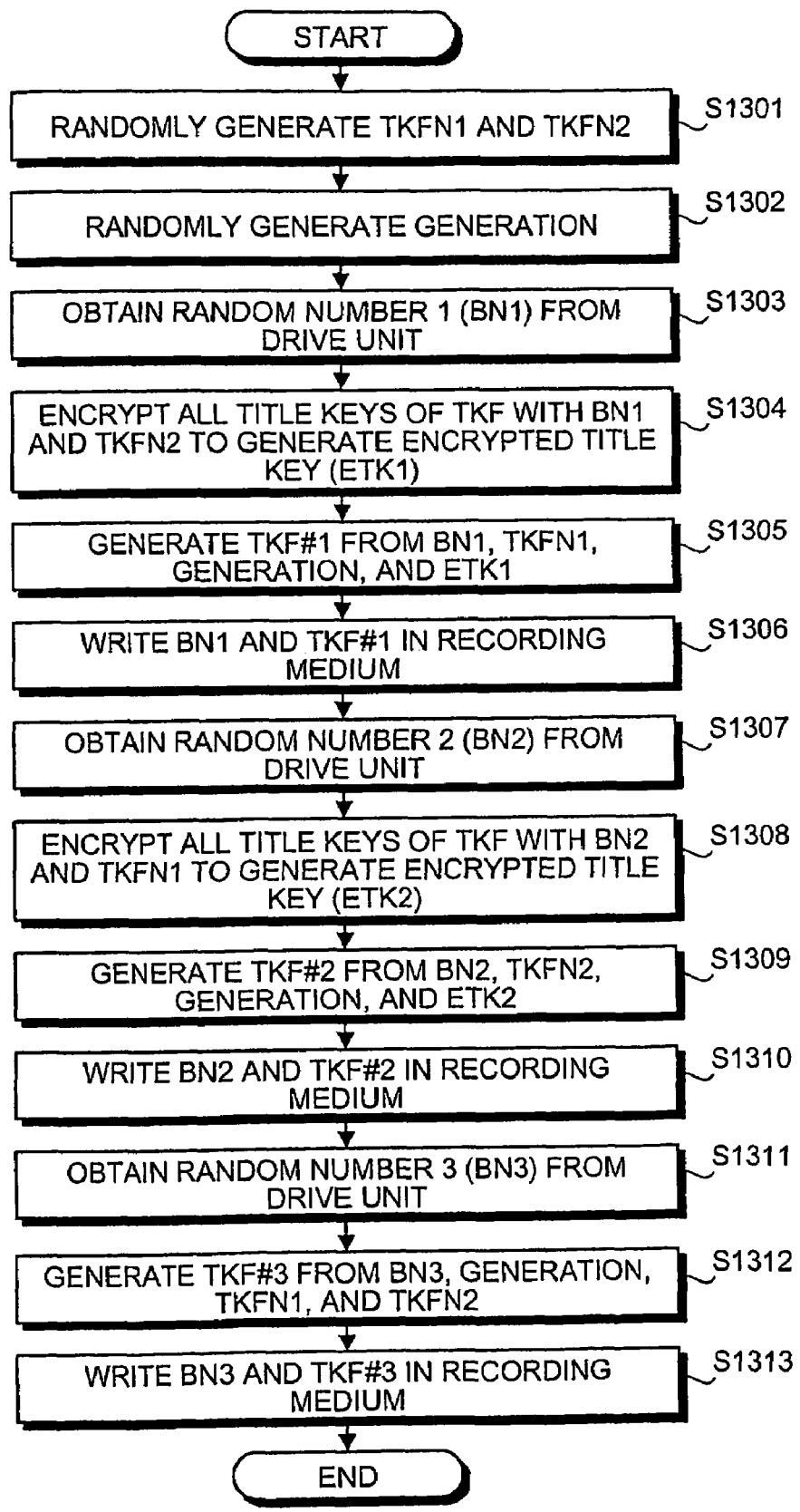
FIG. 13 is a flowchart showing a procedure of a process of initializing the title key file (TKF) backup.

The process of initializing the title key file (TKF) backup will be described below. FIG. 13 is a flowchart showing a procedure of the process of initializing the title key file (TKF) backup. In the backup file initializing process of the second embodiment, as shown in FIG. 13, the backup file TKF#3 differs from TKF#1 and TKF#2 in the structure, and the encrypted title keys (ETK1 and ETK2) are determined by Formulas (4) and (5). Therefore, the backup file initializing process of the second embodiment differs from the backup file initializing process of the first embodiment of FIG. 5 in the process of generating the encrypted title key (ETK1) of the title key file TKF#1, the process of generating the title key file TKF#1, and the process of generating the backup file TKF#3.

First, the host unit 120 generates the title key (TK). The TKF initializing unit 141 causes the random number generating unit 125 to randomly generate the TKF random numbers 1 and 2 (TKFN1 and TKFN2) (Step S1301), and the random number generating unit 125 also randomly generates the generation (Step S1302).

Then, the TKF initializing unit 141 obtains the random number 1 (BN1) retained in the drive unit 110 (Step S503). Generating and obtaining the random number 1 is performed by the method shown in FIG. 3. The generated title key is encrypted with the random number 1 (BN1) and the associated TKF random number 2 (TKFN2) to generate the encrypted title key (ETK1) according to Formula (4) (Step S1304). The TKF initializing unit 141 generates the title key file TKF#1 from the random number 1 (BN1), the TKF random number 1 (TKFN1), the generation, and the generated encrypted title key (ETK1) (Step S1305). The TKF initializing unit 141 transmits the generated title key file TKF#1 to the drive unit 110, and the recording unit 113 records the title key file TKF#1 in the DVD medium 140 (Step S1306).

Then, the TKF initializing unit 141 obtains the random number 2 (BN2) retained in the drive unit 110 (Step S507). Generating and obtaining the random number 2 is performed by the method shown in FIG. 3. The title key (TK) is encrypted with the random number 2 (BN2) and the associated TKF random number 1 (TKFN1) to generate the encrypted title key (ETK2) according to Formula (5) (Step S1308). The TKF initializing unit 141 generates the backup file TKF#2 from the random number 2 (BN2), the TKF random number 2 (TKFN2), the generation, and the generated encrypted title key (ETK2) (Step S1309). The TKF initializing unit 141 transmits the generated backup file TKF#2 to the drive unit 110, and the recording unit 113 records the backup file TKF#2 in the DVD medium 140 (Step S1310).

Then, the TKF initializing unit 141 obtains the random number 3 (BN3) retained in the drive unit 110 (Step S1311). Generating and obtaining the random number 1 is performed by the method shown in FIG. 3. The backup file TKF#3 having a structure shown in FIG. 12 is generated from the random number 3 (BN3), the TKF random number 1 (TKFN1), TKF random number 2 (TKFN2), and the generation (Step S1312). The TKF initializing unit 141 transmits the generated backup file TKF#3 to the drive unit 110, and the recording unit 113 records the backup file TKF#3 in the DVD medium 140 (Step S1313). The title key file TKF#1 and backup files TKF#2 and TKF#3 shown in FIG. 12 are generated through the above process.

Figure 14:
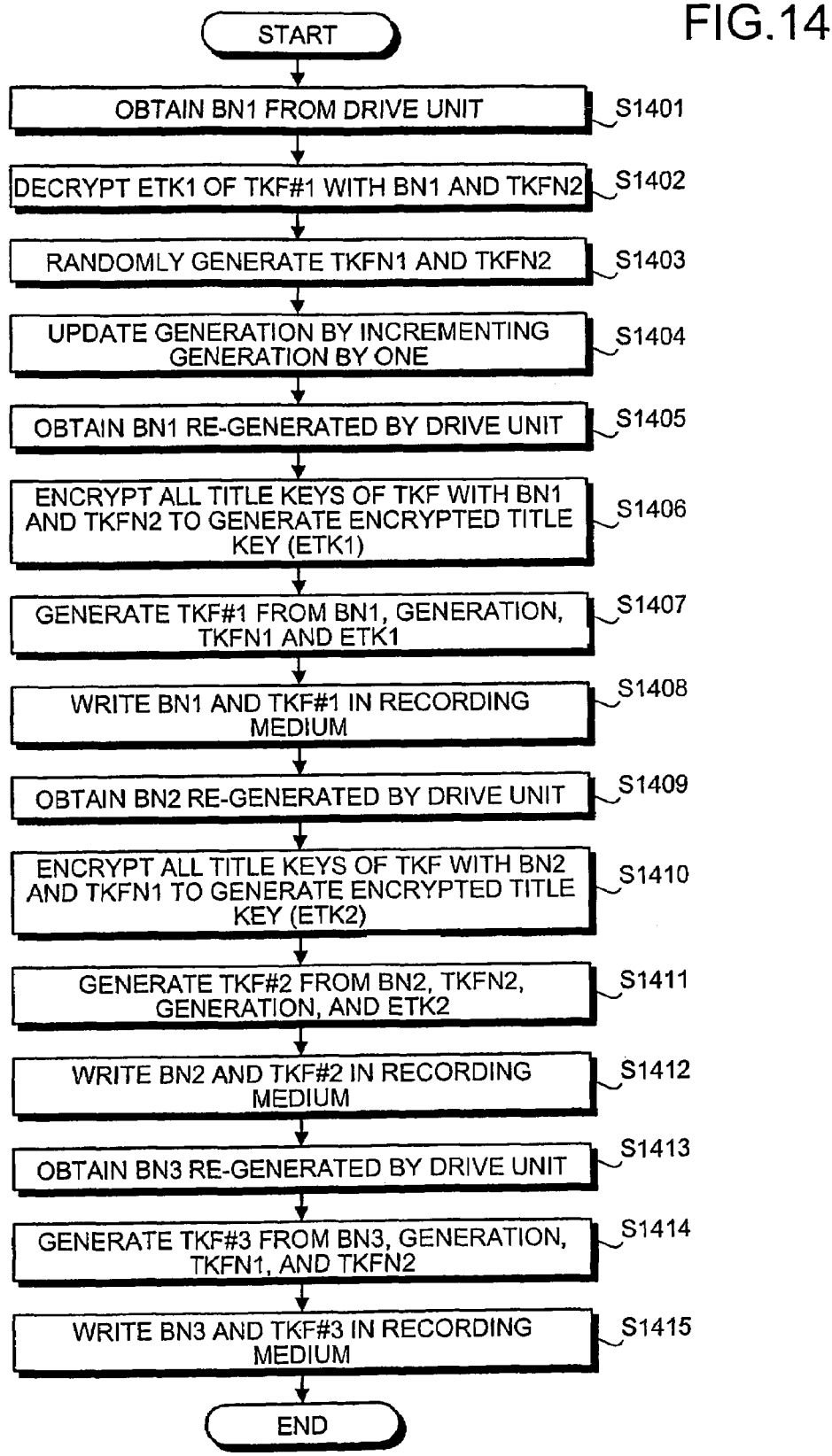
FIG. 14 is a flowchart showing a procedure of a process of updating the title key file (TKF) backup in the second embodiment.

The process of updating the title key file (TKF) backup will be described below. FIG. 14 is a flowchart showing a procedure of the process of updating the title key file (TKF) backup in the second embodiment. In the second embodiment, the backup file TKF#3 differs from TKF#1 and TKF#2 in the structure as shown in FIG. 12, and the encrypted title keys (ETK1 and ETK2) are determined by Formulas (4) and (5). Therefore, the backup updating process of the second embodiment differs from the backup file updating process of the first embodiment of FIG. 6A in the process of decrypting the title key file (TKF#1), the process of generating the encrypted title key (ETK1) of the title key file TKF#1, the process of generating the title key file TKF#1, and the process of generating the backup file TKF#3.

In the second embodiment, the backup file updating process is performed in the case where the list of the title key (TK) is updated by deleting or adding the title contents of the DVD medium 140. At this time, the readout unit 112 reads the title key (TKF#1) and the two backup files TKF#2 and TKF#3 from the DVD medium 140. The TKF updating unit 142 obtains the random number 1 (BN1) recorded on the DVD medium 140 from the readout unit 112 of the drive unit 110 (Step S1401). The encrypted title key (ETK1) of the title key file TKF#1 is decrypted with the random number 1 (BN1) and the associated TKF random number #2 (Step S1402) to obtains the title key (TK) according to Formula (4). The TKF updating unit 142 randomly generates the new TKF random number 1 (TKFN1) and TKF random number 2 (TKFN2) (Step S1403), and the TKF updating unit 142 updates the generation by incrementing the generation by one (Step S1404).

The TKF updating unit 142 requests the drive unit 110 to generate the random number, and the TKF updating unit 142 obtains the new random number 1 (BN1), re-generated by the random number generating unit 111, from the drive unit 110 (Step S1405). The TKF updating unit 142 encrypts the title key (TK) with the new random number 1 (BN1) and the newly associated TKF random number 2 (TKFN2) to generate the encrypted title key (ETK1) according to Formula (4) (Step S1406). The TKF updating unit 142 generates the title key file TKF#1 from the new random number 1 (BN1), the new TKF random number 1 (TKFN1), the updated generation, and the generated encrypted title key (ETK1) (Step S1407) to update TKF#1. The TKF updating unit 142 transmits the updated title key file TKF#1 to the drive unit 110, and the recording unit 113 records the title key file TKF#1 in the DVD medium 140 (Step S1408).

Then, the TKF updating unit 142 requests the drive unit 110 to generate the random number, and the TKF updating unit 142 obtains the new random number 2 (BN2), re-generated by the random number generating unit 111, from the drive unit 110 (Step S1409). The TKF updating unit 142 encrypts the title key (TK) with the new random number 2 (BN2) and the newly associated TKF random number 1 (TKFN1) to generate the encrypted title key (ETK2) according to Formula (5) (Step S1410). The TKF updating unit 142 generates the backup file TKF#2 from the new random number 2 (BN2), the new TKF random number 2 (TKFN2), the updated generation, and the generated encrypted title key (ETK2) (Step S1411) to update TKF#2. The TKF updating unit 142 transmits the updated backup file TKF#2 to the drive unit 110, and the recording unit 113 records the backup file TKF#2 in the DVD medium 140 (Step S1412).

Then, the TKF updating unit 142 requests the drive unit 110 to generate the random number, and the TKF updating unit 142 obtains the new random number 3 (BN3), re-generated by the random number generating unit 111, from the drive unit 110 (Step S1413). The TKF updating unit 142 generates the backup file TKF#3 of structure shown in FIG. 12 from the new random number 3 (BN3), the updated generation, the new TKF random number 1 (TKFN1), and the new TKF random number 2 (TKFN2) (Step S1414) to update TKF#3. The TKF updating unit 142 transmits the updated backup file TKF#3 to the drive unit 110, and the recording unit 113 records the backup file TKF#3 in the DVD medium 140 (Step S1415). Thus, the title key file TKF#1 and the backup files TKF#2 and TKF#3 are updated, and TKF#1, TKF#2, and TKF#3 are sequentially written in the DVD medium 140.

Figure 15:
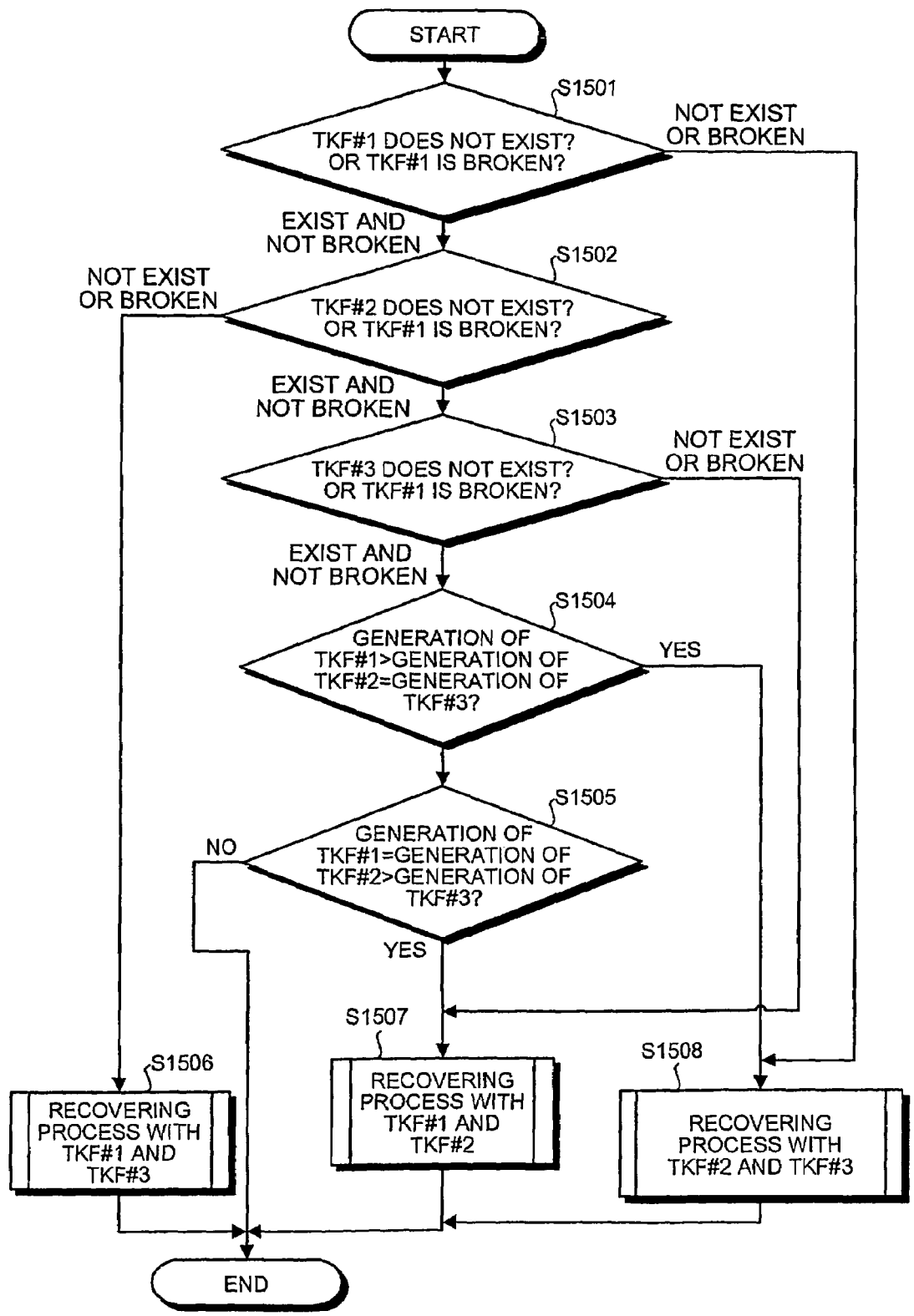
FIG. 15 is a flowchart showing a whole procedure of a process recovering the title key file (TKF#1) in the second embodiment.

The recovering process of backup for the title key file (TKF#1) and backup file. (TKF#2 and TKF#3) will be described below. FIG. 15 is a flowchart showing a whole procedure of the process recovering the title key file (TKF#1). In the second embodiment, the backup file TKF#3 differs from TKF#1 and TKF#2 in the structure as shown in FIG. 12, and the encrypted title keys (ETK1 and ETK2) are determined by Formulas (4) and (5). Therefore, the recovering process of the second embodiment differs from that of the first embodiment.

That is, the determination process from Step S1501 to Step S1505 is similar to the process from Step S701 to step S705 explained in FIG. 7. In the second embodiment, when TKF#2 does not exist or is broken in Step S1502, the recovering process is performed with TKF#1 and TKF#3 (Step S1506). When TKF#3 does not exist or is broken in Step 1503, or when the generation of TKF#3 is smaller than the generations of TKF#1 and TKF#2 in Step S1505, the recovering process is performed with TKF#1 and TKF#2 (Step S1507). When TKF#1 does not exist or is broken in Step 1501, or when the generation of TKF#1 is larger than the generations of TKF#2 and TKF#3 in Step S1504, the recovering process is performed with TKF#2 and TKF#3 (Step S1508).

Figure 16:
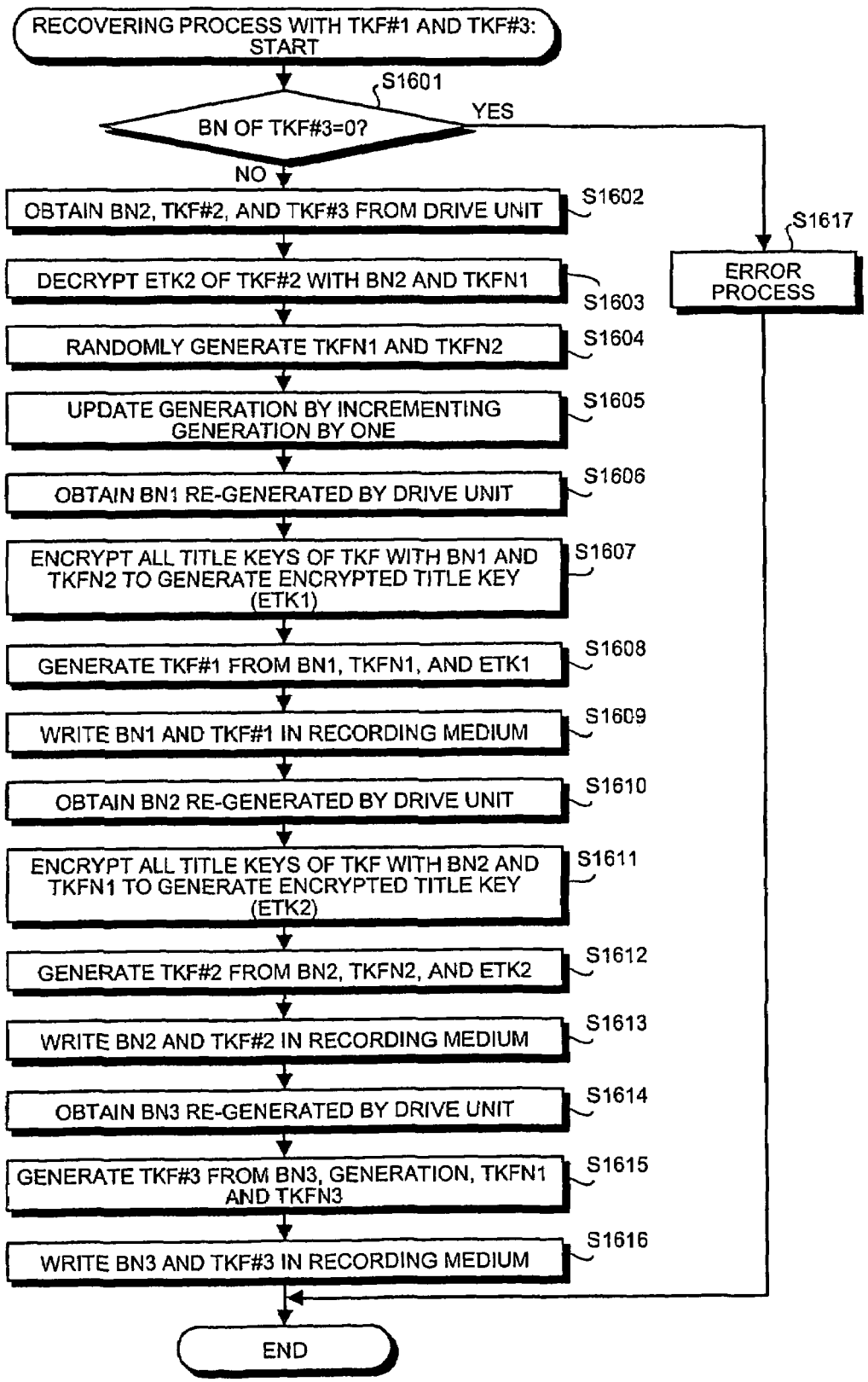
FIG. 16 is a flowchart showing a procedure of a recovering process performed by the backup files TKF#2 and TKF#3 in the second embodiment.

The recovering process performed by decrypting the encrypted title key (ETK2) of the backup files TKF#2 in Step S1508 will be described below. FIG. 16 is a flowchart showing a procedure of the recovering process performed using the backup files TKF#2 and TKF#3. The recovering process of the second embodiment differs from the recovering process of the first embodiment of FIG. 8 in that whether or not "0" which is of the improper information is set to the random number 3 of the backup file TKF#3 is checked using the backup file TKF#2, the process of decrypting the encrypted title key (ETK2) of the backup file TKF#2, the process of generating the encrypted title key (ETK1) of the title key file TKF#1, the process of generating the title key file TKF#1, and the process of generating the backup file TKF#3.

First, the TKF recovering unit 143 checks whether or not "0" which is of the improper information is set in the protected area where the random number 3 (BN3) of TKF#3 is stored (Step S1601). When "0" is set to the random number 3 (BN3) of TKF#3 (Yes in Step S1601), for example, the values of TKFN1 and TKFN2 stored in the user area of TKF#3 are changed by an application such as editor. In this case, because the improper update exists, the TKF recovering unit 143 performs the error process (Step S1617), and the flow is ended without performing the recovering process.

On the other hand, in Step S1601, when "0" is not set in the protect area where the random number 3 (BN3) of TKF#3 is stored (No in Step S1601), the TKF recovering unit 143 determines that TKF#3 is proper, and the TKF recovering unit 143 continues the following recovering process.

The TKF recovering unit 143 obtains the random number 2 (BN2), TKF#2 and TKF#3, recorded on the DVD medium 140, from the drive unit 110 (Step S1602). The TKF recovering unit 143 decrypts the encrypted title key (ETK2) of the backup file TKF#2 with the random number 2 (BN2) and the TKF random number 1 (TKFN1) stored in the TKF#3 according to Formula (5) (Step S1603) to obtain the title key (TK). The TKF updating unit 142 randomly generates the new TKF random numbers 1 and 2 (TKFN1 and TKFN2) (Step S1604), and the TKF updating unit 142 updates the generation by incrementing the generation by one (Step S1605).

Then, the TKF recovering unit 143 requests the drive unit 110 to generate the random number, and the TKF recovering unit 143 obtains the new random number 1 (BN1), re-generated by the random number generating unit 111, from the drive unit 110 (Step S1606). The TKF recovering unit 143 encrypts the title key (TK) with the new random number 1 (BN1) and the newly associated TKF random number 2 (TKFN2) to generate the encrypted title key (ETK1) according to Formula (4) (Step S1607). The TKF recovering unit 143 generates the title key file TKF#1 from the new random number 1 (BN1), the new TKF random number 1 (TKFN1), the updated generation, and the generated encrypted title key (ETK1) (Step S1608) to recover TKF#1. The TKF recovering unit 143 transmits the recovered title key file TKF#1 to the drive unit 110, and the recording unit 113 records the title key file TKF#1 and the random number 1 (BN1) in the DVD medium 140 (Step S1609).

Then, the TKF recovering unit 143 requests the drive unit 110 to generate the random number, and the TKF recovering unit 143 obtains the new random number 2 (BN2), re-generated by the random number generating unit 111, from the drive unit 110 (Step S1610). The TKF recovering unit 143 encrypts the title key (TK) with the new random number 2 (BN2) and the newly associated TKF random number 1 (TKFN1) to generate the encrypted title key (ETK2) according to Formula (5) (Step S1611). The TKF recovering unit 143 generates the backup file TKF#2 from the new random number 2 (BN2), the new TKF random number 2 (TKFN2), the updated generation, and the generated encrypted title key (ETK2) (Step S1612) to recover TKF#2. The TKF recovering unit 143 transmits the recovered backup file TKF#2 to the drive unit 110, and the recording unit 113 records the backup file TKF#2 and the random number 2 (BN2) in the DVD medium 140 (Step S1613).

Then, the TKF recovering unit 143 requests the drive unit 110 to generate the random number, and the TKF recovering unit 143 obtains the new random number 3 (BN3), re-generated by the random number generating unit 111, from the drive unit 110 (Step S1614). The TKF recovering unit 143 generates the backup file TKF#3 having a structure shown in FIG. 12 from the new random number 3 (BN3), the new TKF random number 1 (TKFN1), the new TKF random number 2 (TKFN2), and the updated generation (Step S1615) to recover TKF#3. The TKF recovering unit 143 transmits the recovered backup file TKF#3 to the drive unit 110, and the recording unit 113 records the backup file TKF#3 and the random number 3 (BN3) in the DVD medium 140 (Step S1616). Thus, all the backup files are recovered using TKF#2 and TKF#3.

The recovering process performed using the title key file TKF#1 and the backup file TKF#3 will be described below. FIG. 17 is a flowchart showing a procedure of the recovering process performed using the title key file TKF#1 and the backup file TKF#3. The recovering process of the second embodiment differs from the recovering process performed using TKF#1 in the first embodiment of FIG. 9, in the process of decrypting the encrypted title key (ETK1) of the title key file TKF#1, the process of generating the encrypted title key (ETK1) of the title key file TKF#1, the process of generating the title key file TKF#1, and the process of generating the backup file TKF#3.

First, the TKF recovering unit 143 checks whether or not "0" which is of the improper information is set in the protected area where the random number 3 (BN3) of TKF#3 is stored (Step S1601). When "0" is set to the random number 3 (BN3) of TKF#3 (Yes in Step S1701), for example, the values of TKFN1 and TKFN2 stored in the user area of TKF#3 are changed by an application such as editor. In this case, because the improper update exists, the TKF recovering unit 143 performs the error process (Step S1717), and the flow is ended without performing the recovering process.

On the other hand, in Step S1701, when "0" is not set in the protected area where the random number 3 (BN3) of TKF#3 is stored (No in Step S1701), the TKF recovering unit 143 determines that TKF#3 is proper, and the TKF recovering unit 143 continues the following recovering process.

The TKF recovering unit 143 obtains the random number 1 (BN1) and TKF#1 and TKF#3, recorded on the DVD medium 140, from the drive unit 110 (Step S1702). The TKF recovering unit 143 decrypts the encrypted title key (ETK1) of the backup file TKF#1 with the random number 1 (BN1) and the TKF random number 2 (TKFN2) stored in TKF#3 according to Formula (4) (Step S1703) to obtain the title key (TK). The TKF updating unit 142 randomly generates the new TKF random numbers 1 and 2 (TKFN1 and TKFN2) (Step S1704), and the TKF updating unit 142 updates the generation by incrementing the generation by one (Step S1705).

The subsequent recovering process for TKF#1, TKF#2, and TKF#3 from Step S1706 to Step S1716 is similar to the process from Step S1606 to Step S1616 of FIG. 16. Thus, all the backup files are recovered using TKF#1 and TKF#3.

Then, the recovering process performed using the title key file TKF#1 and the backup file TKF#2 will be described below. FIG. 18 is a flowchart showing a procedure of the recovering process performed by the title key file TKF#1 and the backup file TKF#2. When TKF#3 does not exist or is broken, or when the generation of TKF#3 is smaller than the generations of TKF#2 and TKF#1, the TKF recovering unit 143 performs the recovering process for TKF#3 using TKF#1 and TKF#2.

Therefore, the TKF recovering unit 143 checks whether or not "0" which is of the improper information is set to the random number 1 (BN1) of TKF#1 and the random number 2 (BN2) of TKF#2 (Step S1801). When "0" is set to the random number 1 (BN1) of TKF#1 and the random number 2 (BN2) of TKF#2 (Yes in Step S1801), for example, the value of TKFN2 stored in the user area of the title key file TKF#1 or TKFN1 stored in the user area of the backup file TKF#2 is changed by an application such as editor. In this case, because an improper update may exist, the TKF recovering unit 143 performs the error process (Step S1805), and the flow is ended without performing the recovering process.

On the other hand, in Step S1801, when "0" is not set to the random number 1 (BN1) of TKF#1 and the random number 2 (BN2) of TKF#2 (No in Step S1801), the TKF recovering unit 143 determines that TKF is proper, and the TKF recovering unit 143 continues the following recovering process.

The TKF recovering unit 143 obtains the random number 3 (BN3), TKF#1 and TKF#2, recorded on the DVD medium 140, from the drive unit 110 (Step S1802). The TKF recovering unit 143 reads the TKF random number 1 (TKFN1) and the generation from TKF#1, the TKF recovering unit 143 reads the TKF random number 2 (TKFN2) and the generation from TKF#2, and the TKF recovering unit 143 generates the backup file TKF#3 having the structure shown in FIG. 12 from the new random number 3 (BN3), the generation, the TKF random number 1 (TKFN1), and the TKF random number 2 (TKFN2) (Step S1803) to recover TKF#3. The TKF recovering unit 143 transmits the recovered backup file TKF#3 to the drive unit 110, and the recording unit 113 records the backup file TKF#3 and the random number 3 (BN3) in the DVD medium 140 (Step S1804). Thus, the backup file of TKF#3 is recovered using TKF#1 and TKF#2.

As described above, in the second embodiment, the two encrypted files TKF#1 and TKF#2 of the title key (TK) are prepared, TKF#3 includes the random number 3, the TKF random number 2, the TKF random number 3, and the generation, and the encrypted title keys TKF#1 and TKF#2 are encrypted as shown in Formulas (4) and (5) using the random number of itself and each other's TKF random numbers. Therefore, similarly to the first embodiment, the improper restoration of the title key for the title contents deleted from the DVD medium can be prevented, and the unauthorized use of the title contents can be prevented.

(Second Modification)

In the first and second embodiments, the contents recording and reproducing apparatus 100 has the configuration in which the drive unit 110 and the host unit 120 are connected to each other with the bus 30. However, the drive unit 110 and the host unit 120 may be integrally formed by connecting the drive unit 110 and the host unit 120 with an internal bus. FIG. 19 is a block diagram showing a configuration of a contents recording and reproducing apparatus 1900 in which the drive unit 110 and the host unit 120 are integrally formed by connecting the drive unit 110 and the host unit 120 with an internal bus 1930.

As shown in FIG. 19, the units included in the drive unit 110 are similar to those of the first and second embodiments. However, a host unit 1920 does not include the random number generating unit. In the configuration of FIG. 19, the random number generating unit 111 in drive unit 110 is adapted to be commonly utilized by the host unit 1920 and drive unit 110.

In FIG. 19, the random number generating unit 111 is included in the drive unit 110. Alternatively, the random number generating unit is not included in the drive unit 110, but only the host unit 1920 may include the random number generating unit. Alternatively, the random number generating unit is not directly included in the drive unit 110 and the host unit 1920, but another unit in the apparatus except for the drive unit 110 and the host unit 120 may include the random number generating unit.

A contents recording and reproducing program executed in the contents recording and reproducing apparatus of the first and second embodiments is provided while previously incorporated in a ROM or the like.

The contents recording and reproducing program executed in the contents recording and reproducing apparatus of the first and second embodiments may be provided by recording the contents recording and reproducing program in a computer readable recording medium such as a CD-ROM, a flexible disk (FD), a CD-R, and a DVD as a file having an installable format or an executable format.

The contents recording and reproducing program executed in the contents recording and reproducing apparatus of the first and second embodiments may be provided by storing the program in a computer connected to a network such as the Internet and by downloading the program through the network. The contents recording and reproducing program executed in the contents recording and reproducing apparatus of the first and second embodiments may be provided or distributed through the network such as the Internet.

The contents recording and reproducing program executed in the contents recording and reproducing apparatus of the first and second embodiments has a module structure including the above-described units (a contents encryption processing unit 121, a contents decryption processing unit 122, a TKF encryption processing unit 123, and a backup processing unit 140). In actual hardware, a CPU (processor) reads the contents recording and reproducing program from the ROM to execute the contents recording and reproducing program, which allows each unit to be loaded on a main storage device to generate the contents encryption processing unit 121, the contents decryption processing unit 122, the TKF encryption processing unit 123, and the backup processing unit 140 on the main storage device.

Instead of the built-in type instrument such as the DVD recorder, the contents recording and reproducing apparatus of the first and second embodiments may utilize a usual computer while including a control device such as the CPU, a storage device such as the ROM (Read Only Memory) and a RAM, an external storage device such as an HDD and a CD drive, a display device, and an input device such as a keyboard and a mouse. In this case, for example, a USB can be used as the bus connecting the host unit 120 and the drive unit 110.

The invention shall not be limited to the above embodiments. In an implementation stage, various change and modification may be made without departing from the scope and spirit of the invention.

INDUSTRIAL APPLICABILITY

As described above, the contents recording and reproducing apparatus, the contents recording and reproducing method, and the contents recording and reproducing program product according to the invention are useful for the DVD recording and reproducing apparatus, the DVD recording and reproducing method, and the DVD recording and reproducing program product, in which the contents are recorded in or reproduced from the DVD medium. Particularly the invention is suitable for the DVD recording and reproducing apparatus, the DVD recording and reproducing method, and the DVD recording and reproducing program product, in which the contents are recorded while encrypted.

The invention claimed is:

1. A contents recording apparatus comprising:
   a recording unit which performs a record of a recording medium, in which the recording medium records a title key file registering therein at least one of a title key which encrypts each of plural title contents corresponding to a program video or sound, and title contents encrypted by the title key;
   a key file generating unit which generates at least one of the title key file and registers at least one of the title key in the generated title key file;
   a random number generating unit which generates a random number corresponding to each of the plural title key files; and
   a TKF random number generating unit which generates a TKF random number for encrypting other title key file associated with the title key file,
   wherein the recording unit records a set of the title key file generated and the random number in the recording medium, and
   the key file generating unit registers the random number corresponding to the title key file, the TKF random number corresponding to the title key file, and an encrypted title key, where the encrypted title key is formed by encrypting the title key with the random number registered in the title key file and with the TKF random number registered in the other title key file.

2. The apparatus according to claim 1, wherein a first title key file is associated with a third title key file, a second title key file is associated with the first title key file, the third title key file is associated with the second title key file, and
   the key file generating unit further registers a first encrypted title key, the random number and the TKF random number each corresponding to the first title key file, where the first encryption title key is formed by encrypting the title key with the random number registered in the first title key file and the TKF random number registered in the third title key file, registers a second encrypted title key, the random number and the TKF random number each corresponding to the second title key file, where the second encryption title key is formed by encrypting the title key with the random number registered in the second title key file and the TKF random number registered in the first title key file, and registers a third encrypted title key, the random number and the TKF random number each corresponding to the third title key file, where the third encryption title key is formed by encrypting the title key with the random number registered in the third title key file and the TKF random number registered in the second title key file.

3. The apparatus according to claim 1, wherein a first title key file is associated with a second title key file, the second title key file is associated with the first title key file, and
   the key file generating unit further registers a first encrypted title key, the random number and the TKF random number each corresponding to the first title key file, where the first encryption title key is formed by encrypting the title key with the random number registered in the first title key file and the TKF random number registered in the second title key file, and registers a second encrypted title key, the random number and the TKF random number each corresponding to the second title key file, where the second encryption title key is formed by encrypting the title key with the random number registered in the second title key file and the TKF random number registered in the first title key file.

4. The apparatus according to claim 1 further comprising:

a decrypting unit which decrypts the encrypted title key registered in the title key file by using the random number being registered in the title key file read from the recording medium, and the TKF random number being registered in the other title key file associated with the title key file, when a new title key is added to the recording medium, or when the arbitrary title key is deleted from the recording medium;

a re-encrypting unit which generates the encrypted title key by encrypting the decrypted title key with the new random number and the TKF random number registered in the other title key file; and an updating unit which updates the plurality of title key files by generating the plurality of title key files in which the encrypted title key, the random number, and the TKF random number are registered, wherein the random number generating unit newly generates the random number registered in each of the plurality of title key files, the TKF random number generating unit newly generates the TKF random number registered in each of the plurality of title key files, and the recording unit records the plurality of title key files updated by the updating unit in the recording medium.

5. The apparatus according to claim 4, wherein a first title key file is associated with a third title key file, a second title key file is associated with the first title key file, the third title key file is associated with the second title key file, and the decrypting unit further decrypts the encrypted title key registered in the first title key file by using the random number being registered in the first title key file read from the recording medium, and the TKF random number being registered in the third title key file, when a new title key is added to the recording medium, or when the arbitrary title key is deleted from the recording medium, and the re-encrypting unit generates the encrypted title key in the first title key file by encrypting the title key being registered in the decrypted title key file with the new random number corresponding to the first title key and the new TKF random number corresponding to the third title key file, generates the encrypted title key in the second title key file by encrypting the title key being registered in the decrypted title key file with the new random number corresponding to the second title key and the new TKF random number corresponding to the first title key file, and generates the encrypted title key in the third title key file by encrypting the title key being registered in the decrypted title key file with the new random number corresponding to the third title key and the new TKF random number corresponding to the second title key file.

6. The apparatus according to claim 4, wherein a first title key file is associated with a second title key file, the second title key file is associated with the first title key file, and the decrypting unit further decrypts the encrypted title key being registered in the first title key file by using the random number being registered in the first title key file read from the recording medium, and the TKF random number being registered in the second title key file, when a new title key is added to the recording medium, or when the arbitrary title key is deleted from the recording medium, and the re-encrypting unit generates the encryption title key in the first title key file by encrypting the title key being registered in the decrypted title key file with the new random number corresponding to the first title key file and the new TKF random number corresponding to the second title key file, and generates the encryption title key in the second title key file by encrypting the title key being registered in the decrypted title key file with the new random number corresponding to the second title key file and the new TKF random number corresponding to the first title key file.

7. The apparatus according to claim 4, wherein the title key file further registers a generation indicating a version of the title key, and the updating unit updates the plurality of title key files, when all the generations of the plurality of title key files read from the recording medium coincide with each other.

8. The apparatus according to claim 1, wherein the decrypting unit decrypts the encrypted title key being registered in the title key file by using the random number being registered in the title key file existing in the recording medium, and the TKF random number being registered in the other title key file associated with the title key file, when the arbitrary title key file does not exist or is broken in the plurality of title key files recorded in the recording medium, the recording unit further comprises a recovering unit which recovers the plurality of title key files by generating the plurality of title key files, wherein the plurality of title key files register the encrypted title key being encrypted by the re-encrypting unit, the random number being newly generated by the random number generating unit, and the TKF random number being newly generated by the TKF random number generating unit, and the recording unit records the plurality of title key files recovered by the recovering unit in the recording medium.

9. The apparatus according to claim 8, wherein a first title key file is associated with a third title key file, a second title key file is associated with the first title key file, the third title key file is associated with the second title key file, and the decrypting unit decrypts the encrypted title key being registered in the third title key file by using the random number being registered in the third title key file existing in the recording medium, and the TKF random number being registered in the second title key file, when the first title key does not exist or is broken in the recording medium, and the re-encrypting unit generates the encrypted title key in the first title key file by encrypting the title key being registered in the decrypted third title key file with the new random number corresponding to the first title key file and the new TKF random number corresponding to the third title key file, generates the encrypted title key in the second title key file by encrypting the title key being registered in the decrypted third title key file with the new random number corresponding to the second title key file and the new TKF random number corresponding to the first title key file, and generates the encrypted title key in the third title key file by encrypting the title key being registered in the decrypted third title key file with the new random number corresponding to the third title key file and the new TKF random number corresponding to the second title key file.

10. The apparatus according to claim 8, wherein a first title key file is associated with a second title key file, the second title key file is associated with the first title key file, and the decrypting unit decrypts the encrypted title key being registered in the second title key file by using the random number being registered in the second title key file existing in the recording medium, and the TKF random number being registered in the first title key file, when the first title key file does not exist or is broken in the recording medium, and the re-encrypting unit generates the encrypted title key in the first title key file by encrypting the title key being registered in the decrypted second title key file with the new random number corresponding to the first title key file and the new TKF random number corresponding to the second title key file, and generates the encrypted title key in the second title key file by encrypting the title key being registered in the decrypted second title key file with the new random number corresponding to the second title key file and the new TKE random number corresponding to the first title key file.

11. The apparatus according to claim 8, wherein the title key file further registers a generation indicating a version of the title key, and the recovering unit recovers the plurality of title key files, when any one of the generations of the plurality of title key files read from the recording medium does not coincide with each other.

12. The apparatus according to claim 8, wherein the recording medium includes a protected area incapable of writing an arbitrary value therein, and a user area capable of recording an arbitrary value by an arbitrary application therein, the recording unit records the random number of the title key file in the protected area, records the TKF random number in the user area.

13. A method of recording contents comprising:

performing a record of a recording medium, in which the recording medium records a title key file registering therein at least one of a title key which encrypts each of plural title contents corresponding to a program video or sound, and title contents encrypted by the title key;

generating at least one of the title key file and registering at least one of the title key in the generated title key file;

generating a random number corresponding to each of the plural title key files;

generating a TKF random number for encrypting other title key file;

recording a set of the title key file generated and the random number in the recording medium; and registering the random number corresponding to the title key file, the TKIF random number corresponding to the title key file, and an encrypted title key, where the encrypted title key is formed by encrypting the title key with the random number corresponding to the title key file and with the TKY random number corresponding to the other title key file.

14. A non-transitory computer readable medium having stored thereon a computer program including programmed instructions that when executed by a computer cause the computer to perform a method for recording contents, the method comprising:

performing a record of a recording medium, in which the recording medium records a title key file registering therein at least one of a title key which encrypts each of plural title contents corresponding to a program video or sound, and title contents encrypted by the title key;

generating at least one of the title key file and registering at least one of the title key in the generated title key file;

generating a random number corresponding to each of the plural title key files;

generating a TKF random number for encrypting other title key file;

recording a set of the title key file generated and the random number in the recording medium; and registering the random number corresponding to the title key file, the TKF random number corresponding to the title key file, and an encrypted title key, where the encrypted title key is formed by encrypting the title key with the random number corresponding to the title key file and with the TKF random number corresponding to the other title key file.

15. The apparatus according to claim 8, wherein the recording unit records valid information in the protected area when a file except for the title key file is recorded, and wherein the recovering unit determines whether the invalid information is recorded in the random number or not when the encrypted title key is decrypted, and does not recover the plurality of title key files when the invalid information is recorded.

16. A contents recording apparatus for recording a title key file registering therein at least one of a title key for encrypting contents and the contents encrypted by the title key in a recording medium, comprising:

a generating unit which generates a first title key file, a second title key file and a third title key file;

a first random number generating unit which generates a first random number corresponding to the first title key file, a first random number corresponding to the second title key file and a first random number corresponding to the third title key file;

a second random number generating unit which generates a second random number corresponding to the first title key file, a second random number corresponding to the second title key file and a second random number corresponding to the third title key file; and a recording unit which records the first title key file, the second title key file and the third title key file in the recording medium, wherein the first title key file includes the first random number corresponding to the first title key file, the second random number corresponding to the first title key file, the title key encrypted by the first random number corresponding to the first title key file and the second random number corresponding to the third title key file, the second title key file includes the first random number corresponding to the second title key file, the second random number corresponding to the second title key file, the title key encrypted by the first random number corresponding to the second title key file and the second random number corresponding to the first title key file, and the third title key file includes the first random number corresponding to the third title key file, the second random number corresponding to the third title key file, the title key encrypted by the first random number corresponding to the third title key file and the second random number corresponding to the second title key file.

17. A contents reproducing apparatus for accessing a recording medium in which the recording medium records a title key file registering therein at least one of a title key for encrypting contents and the contents encrypted by the title key in a recording medium, and reproducing the contents wherein the recording medium records therein a first title key file, a second title key file and a third title key file, the first title key file includes the first random number corresponding to the first title key file, the second random number corresponding to the first title key file, the title key encrypted by the first random number corresponding to the first title key file and the second random number corresponding to the third title key file, the second title key file includes the first random number corresponding to the second title key file, the second random number corresponding to the second title key file, the title key encrypted by the first random number corresponding to the second title key file and the second random number corresponding to the first title key file, and the third title key file includes the first random number corresponding to the third title key file, the second random number corresponding to the third title key file, the title key encrypted by the first random number corresponding to the third title key file and the second random number corresponding to the second title key file, the apparatus further comprising:

a first decrypting unit which decrypts the title key in the first title key file by using the first random number in the first title key file corresponding to the first title key file, the second random number in the third title key file corresponding to the third title key file;

a second decrypting unit which decrypts the contents by using the title key decrypted by the first decrypting unit; and a reproducing unit which reproduces the contents decrypted by the second decrypting unit.

18. The apparatus according claim 17, wherein the first decrypting unit decrypts the title key in the third title key file by using the first random number in the third title key file corresponding to the third title key file, the second random number in the second title key file corresponding to the second title key file, when the first title key file does not exist or is broken.

* * * * *